US012717955B2

(12) United States Patent
Jurat et al.

(10) Patent No.: US 12,717,955 B2
(45) **Date of Patent: *Aug. 25, 2026**

(54) SYSTEMS AND METHODS FOR BLOCKCHAIN-BASED NON-FUNGIBLE TOKEN (NFT) AUTHENTICATION

(71) Applicant: Fidelity Information Services, LLC, Jacksonville, FL (US)

(72) Inventors: Luke Jurat, Fairfax, VA (US); Vuk Radoicic, Belgrade (RS); Stefan Lazovic, Belgrade (RS); Brandon Castro, Jacksonville, FL (US); Jeffrey G. Poli, Wauwatosa, WI (US)

(73) Assignee: Fidelity Information Services, LLC, Jacksonville, FL (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/975,486

(22) Filed: Dec. 10, 2024

(65) Prior Publication Data

US 2026/0162101 A1 Jun. 11, 2026

Related U.S. Application Data

(63) Continuation of application No. 18/050,631, filed on Oct. 28, 2022, now Pat. No. 12,204,672, which is a (Continued)

(51) Int. Cl.
*G06Q 20/36* (2012.01)
*G06Q 20/40* (2012.01)

(52) U.S. Cl.
CPC ..... *G06Q 20/367* (2013.01); *G06Q 20/40145* (2013.01)

(58) Field of Classification Search
None
See application file for complete search history.

(56) References Cited

U.S. PATENT DOCUMENTS 11,373,453 B2 * 6/2022 Young .................... G06V 40/50
11,882,219 B2 * 1/2024 Young .................... H04L 9/3213

(Continued)

FOREIGN PATENT DOCUMENTS

CN 114817888 A 7/2022

OTHER PUBLICATIONS

International Search Report issued in International Application No. PCT/US2023/018596 dated Jun. 9, 2023 (12 pages).

(Continued)

*Primary Examiner* — Lashonda Jacobs-Burton
(74) *Attorney, Agent, or Firm* — Bookoff McAndrews, PLLC

(57) ABSTRACT

Systems and methods are disclosed for generating blockchain-based dynamic non-fungible tokens (NFTs) for user authentication. The method includes receiving a request from a mobile device associated with a user. Capturing, via one or more sensors, images and/or videos of the user and/or identification data associated with the user. Processing the images and/or the videos to detect biometric data unique to the user. Encoding the detected biometric data for generating the dynamic NFTs. Storing the dynamic NFTs on a transaction block of a distributed blockchain, wherein the dynamic NFTs are associated with a programmatically defined smart contract written to the distributed blockchain. Transmitting the dynamic NFTs to a plurality of service providers for authenticating the user.

20 Claims, 19 Drawing Sheets

Related U.S. Application Data continuation of application No. 17/894,869, filed on Aug. 24, 2022, now Pat. No. 12,204,671.

(56) References Cited

U.S. PATENT DOCUMENTS

| | | | | |
|---|---|---|---|---|
| 12,200,131 | B1 * | 1/2025 | Mars | H04L 9/3231 |
| 2021/0243027 | A1 * | 8/2021 | Gupta | H04L 9/3213 |
| 2021/0256070 | A1 * | 8/2021 | Tran | G06F 16/9536 |
| 2021/0357489 | A1 * | 11/2021 | Tali | G06F 21/32 |
| 2022/0215382 | A1 * | 7/2022 | Chen | G06Q 20/02 |
| 2022/0271915 | A1 * | 8/2022 | Turner | G06F 40/211 |
| 2022/0309491 | A1 * | 9/2022 | Shapiro | G06F 21/64 |
| 2023/0017499 | A1 * | 1/2023 | Agrawal | H04L 9/3236 |
| 2023/0034169 | A1 * | 2/2023 | Ferenczi | H04L 9/0894 |
| 2023/0063408 | A1 * | 3/2023 | Young | G06Q 20/38215 |
| 2023/0066630 | A1 * | 3/2023 | deWaide | G06Q 20/401 |
| 2023/0138797 | A1 * | 5/2023 | Kurian | G06F 21/602 713/193 |
| 2023/0177489 | A1 * | 6/2023 | Chan | G06Q 20/3672 705/66 |
| 2023/0186281 | A1 * | 6/2023 | Todasco | G06Q 20/38215 705/64 |
| 2023/0196342 | A1 * | 6/2023 | Mullen | G06Q 20/3672 705/66 |
| 2023/0245103 | A1 * | 8/2023 | Lacavera | H04L 9/14 705/66 |
| 2023/0274245 | A1 * | 8/2023 | Quigley | G06Q 20/02 705/65 |
| 2023/0298001 | A1 * | 9/2023 | Jethmalani | G06Q 20/36 705/65 |
| 2023/0315877 | A1 * | 10/2023 | McMillon | G06F 21/6209 726/27 |
| 2023/0334569 | A1 * | 10/2023 | Maurer | G06Q 20/3678 |
| 2023/0368189 | A1 * | 11/2023 | Ambrose | H04L 9/50 |
| 2023/0384967 | A1 * | 11/2023 | Singh | G06N 20/00 |
| 2023/0412597 | A1 * | 12/2023 | Pemmaraju | H04L 9/0637 |
| 2024/0005309 | A1 * | 1/2024 | Osborn | G06Q 20/065 |
| 2024/0039721 | A1 * | 2/2024 | Young | H04L 9/3213 |
| 2024/0039722 | A1 * | 2/2024 | DeLuca | H04L 9/50 |
| 2024/0046249 | A1 * | 2/2024 | Chung | G06Q 20/36 |
| 2024/0062184 | A1 * | 2/2024 | Sethia | G06Q 20/0655 |
| 2024/0073026 | A1 * | 2/2024 | Albero | H04L 9/3239 |
| 2024/0161109 | A1 * | 5/2024 | Bakshi | H04L 9/50 |
| 2024/0171398 | A1 * | 5/2024 | Kendapadi | H04L 9/3297 |
| 2024/0193567 | A1 * | 6/2024 | Bettati | G06Q 20/123 |
| 2025/0166064 | A1 * | 5/2025 | Voorhees | G06Q 30/0641 |

OTHER PUBLICATIONS

International Search Report issued in International Application No. PCT/US2023/063902 dated Jun. 6, 2023 (10 pages).

* cited by examiner

SYSTEMS AND METHODS FOR BLOCKCHAIN-BASED NON-FUNGIBLE TOKEN (NFT) AUTHENTICATION

RELATED APPLICATIONS

This application is a continuation of and claims the benefit of U.S. Non-Provisional application Ser. No. 18/050,631 filed Oct. 28, 2022, issued as U.S. Pat. No. 12,204,672, which is a continuation of U.S. Non-Provisional application Ser. No. 17/894,869 filed Aug. 24, 2022, issued as U.S. Pat. No. 12,204,671, each of which are hereby incorporated by reference in their entireties.

FIELD OF DISCLOSURE

The present disclosure relates generally to transaction authentication mechanisms, and more particularly, to systems and methods for blockchain-based non-fungible tokens (NFTs) authentication.

BACKGROUND

Service providers, e.g., financial institutions, can sometimes have a high user abandonment rate due to friction during the onboarding process. Typically, users attempt to register on a service provider's website, however, they might be discouraged to complete the registration process because of the lengthiness of the required fields, e.g., users are required to manually enter personal and financial information into a lengthy list of input fields. Amid more and more frequent data breaches, users are sometimes hesitant to leave their personal and financial credentials in centralized servers across platforms of various service providers due to security concerns. Such requirements to manually enter personal and financial credentials in centralized servers across several platforms can turn some users away prematurely, causing the abandonment of the enrollment process and the online transaction.

Accordingly, there is a need for systems and methods that provides a simple and secure onboarding process that reduces the friction during onboarding and also provides enhanced data security.

SUMMARY

According to certain aspects of the present disclosure, systems and methods are disclosed for generating blockchain-based dynamic non-fungible tokens (NFTs) for user authentication.

In one embodiment, a system for generating dynamic NFTs for authenticating one or more users is disclosed. The system includes a mobile device, including: one or more sensors configured to capture an image or a video; at least one memory storing instructions; and one or more processors operatively connected with the one or more sensors and the at least one memory, and configured to execute the instructions to perform operations, including: receiving at least one request from one or more mobile devices associated with the one or more users; capturing, via the one or more sensors, one or more images, one or more videos, or a combination thereof of the one or more users, identification data associated with the one or more users, or a combination thereof; processing the one or more images, the one or more videos, or a combination thereof to detect biometric data unique to the one or more users; encoding the detected biometric data for generating the dynamic NFTs;

storing the dynamic NFTs on a transaction block of a distributed blockchain, wherein the dynamic NFTs are associated with a programmatically defined smart contract written to the distributed blockchain; and transmitting the dynamic NFTs to a plurality of service providers for authenticating the one or more users.

In accordance with another embodiment, a computer-implemented method for generating dynamic NFTs for authenticating one or more users is disclosed. The computer-implemented method includes: receiving at least one request from one or more mobile devices associated with the one or more users; capturing, via one or more sensors, one or more images, one or more videos, or a combination thereof of the one or more users, identification data associated with the one or more users, or a combination thereof; processing the one or more images, the one or more videos, or a combination thereof to detect biometric data unique to the one or more users; encoding the detected biometric data for generating the dynamic NFTs; storing the dynamic NFTs on a transaction block of a distributed blockchain, wherein the dynamic NFTs are associated with a programmatically defined smart contract written to the distributed blockchain; and transmitting the dynamic NFTs to a plurality of service providers for authenticating the one or more users.

In accordance with a further embodiment, non-transitory computer readable medium for generating dynamic NFTs for authenticating one or more users is disclosed. The non-transitory computer readable medium storing instructions which, when executed by one or more processors, cause the one or more processors to perform operations, comprising: receiving at least one request from one or more mobile devices associated with the one or more users; capturing, via one or more sensors, one or more images, one or more videos, or a combination thereof of the one or more users, identification data associated with the one or more users, or a combination thereof; processing the one or more images, the one or more videos, or a combination thereof to detect biometric data unique to the one or more users; encoding the detected biometric data for generating the dynamic NFTs; storing the dynamic NFTs on a transaction block of a distributed blockchain, wherein the dynamic NFTs are associated with a programmatically defined smart contract written to the distributed blockchain; and transmitting the dynamic NFTs to a plurality of service providers for authenticating the one or more users.

In some embodiments, the non-transitory machine readable medium may be embedded into various nodes of the blockchain. Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
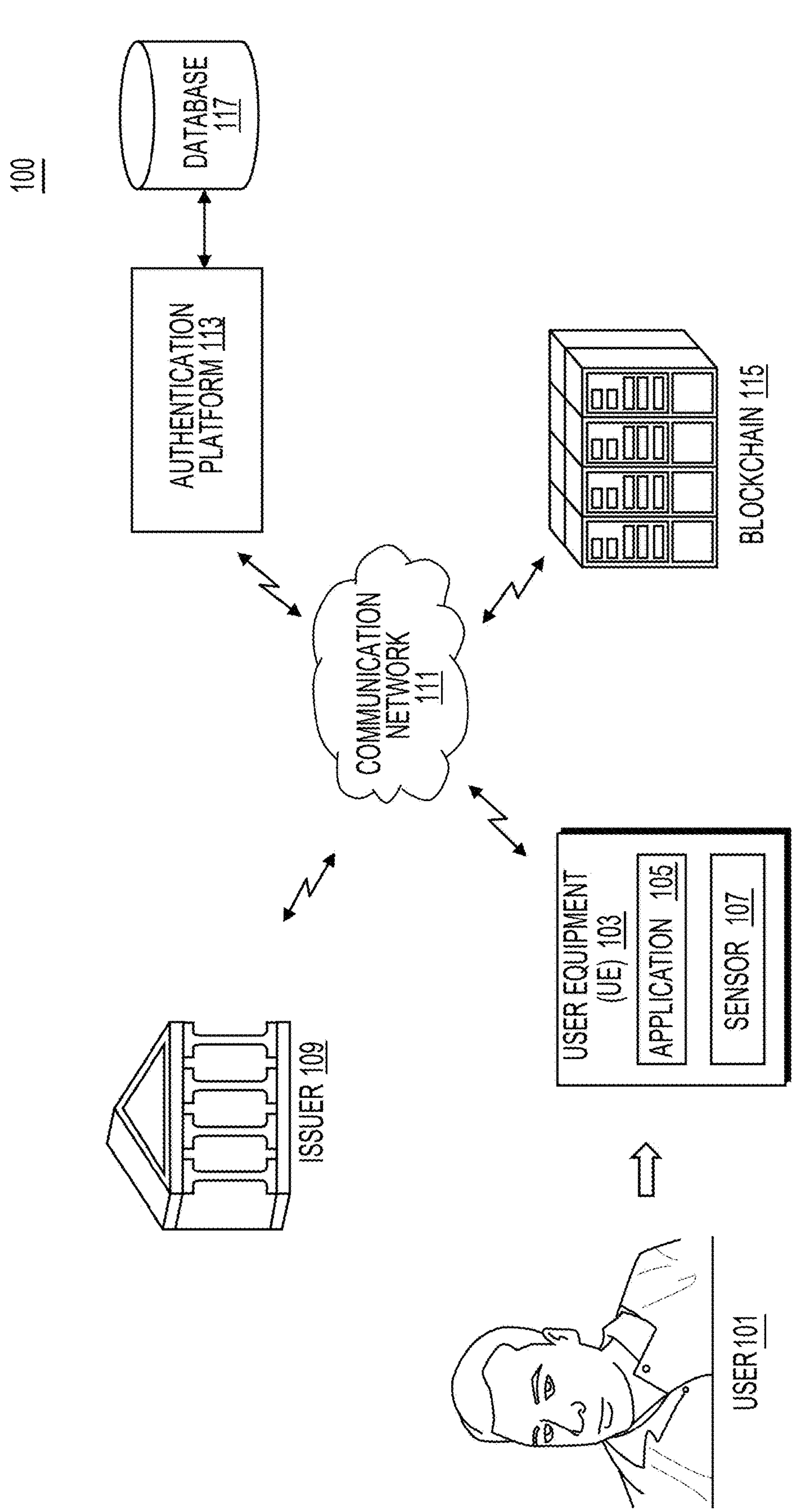
FIG. 1 is a diagram of a system configured for generating blockchain-based dynamic NFTs for user authentication, according to aspects of the disclosure.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for generating blockchain-based dynamic NFTs for user authentication.

Conventionally, users may open an account, e.g., digital wallets, with a service provider by registering with their website. For example, users may be required to manually input information, e.g., name, email address, physical address, credit card information, bank account information, etc., into a lengthy list of data fields. Such time-consuming and complex onboarding processes may cause friction that turns away interested users, e.g., potential customers. Onboarding is an important step for any online process, and it is also the step where comprehensive verification is used to authenticate the users. For example, authentication methods during onboarding may include complex processes, such as multifactor authentication (MFA), background checks, or advanced biometric procedures. These processes can be obtrusive and may deter legitimate users. Users value their time and often desire easy and secure access to banking products. The users may also desire to receive favorable deals and be able to manage their personal digital data. However, the current onboarding process can be time-consuming and inefficient, e.g., repetitive questions are asked resulting in user frustrations. The users may be required to provide identification information on each web page of the service providers, and they might not have control over the data provided to these service providers. Users may also be interested in the security measures undertaken by the service providers to protect users' personal information.

Each service provider may have centralized servers that may store user credentials. Since it can be difficult to gauge the safeguards undertaken by each of the service providers to secure their data, requiring users to store their personal and financial information on different servers may expose users to a security risk. In one example embodiment, service providers with higher abandonment rates and previous data breaches are also concerned about the security of data that is stored. They are continuously challenged to provide a technical solution to reduce the time it takes to onboard new clients, streamline the KYC process, reduce the abandonment rates, and prevent potential data breaches in the future.

To address these problems, system 100 of FIG. 1 introduces the capability to generate blockchain-based dynamic NFTs for user authentication. System 100 provides a unique method that implements a blockchain-based know-your-customer (KYC) solution that may have a one-time onboarding process to mint a user's KYC-required information onto the blockchain as decentralized dynamic NFTs. System 100 may also provide wallet extensions where the NFTs are stored to enable future use of the NFTs while also allowing users to have full control of the NFTs stored on the blockchain. This approach is a significant improvement over the current technology that is time-consuming, inefficient, obstructive, results in friction during the onboarding process, and exposes users to security risks.

System 100 takes advantage of ubiquitous modern technology infrastructure to collect, verify, and store a user's identification on the blockchain as a dynamic NFT. System 100 efficiently manages these stored dynamic NFTs to reduce friction during onboarding, via a simple KYC process, leading to a much lower abandonment rate and ultimately higher revenue. Such a simple KYC process that implements dynamic NFTs significantly reduces data breach risks by storing data on the blockchain instead of centralized servers across different platforms. Furthermore, system 100 provides users with a solution to control the use of their digital identity.

FIG. 1 is a diagram of a system capable of generating blockchain-based dynamic NFTs for user authentication, according to one example embodiment. FIG. 1 introduces a capability to implement modern communication and data processing capabilities into existing methods and systems for generating dynamic NFTs and storing the dynamic NFTs in a blockchain for authentication. FIG. 1, an example architecture of one or more example embodiments of the present invention, includes system 100 that comprises user 101, user equipment (UE) 103 that includes application 105 and sensors 107, issuer 109, communication network 111, authentication platform 113, blockchain 115, and database 117.

In one embodiment, user 101 may be a person or any entity interacting with a user interface or a web interface associated with a service provider, e.g., issuer 109, to open an account, e.g., digital wallet accounts. In one embodiment, user 101 may include a registered user, a potential user, a returning user, a visiting user, an authorized user, an unauthorized user, etc., for payment-related services provided by the service provider.

In one embodiment, UE 103 may include, but is not restricted to, any type of a mobile terminal, wireless terminal, fixed terminal, or portable terminal. Examples of the UE 103, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, the UE 103 may facilitate various input means for receiving and generating information, including, but not restricted to, a touch screen capability, a keyboard, and keypad data entry, a voice-based input mechanism, and the like. Any known and future implementations of the UE 103 may also be applicable.

In one embodiment, UE 103 may include applications 105. Further, applications 105 may include various applications such as, but not restricted to, content provisioning applications, networking applications, multimedia applications, media player applications, camera/imaging applications, software applications, and the like. In one embodiment, one of the applications 105 at UE 103 may act as a client for authentication platform 113 and may perform one or more functions associated with the functions of authentication platform 113 by interacting with authentication platform 113 over communication network 111.

By way of example, sensor 107 may be any type of sensor. In one embodiment, sensors 107 may include, for example, a network detection sensor for detecting wireless signals or receivers for different short-range communications (e.g., Bluetooth, Wi-Fi, Li-Fi, near field communication (NFC), etc.), a camera/imaging sensor for gathering image data, an audio recorder for gathering audio data, and the like. In one embodiment, sensors 107 may include a ledger sensor, e.g., a software implemented alongside blockchain 115 that may monitor every transaction written to blockchain 115 for information that the ledger sensors is instructed to find. Such ledger sensor may be activated by a request to search through blockchain 115 for data corresponding to the request.

In one embodiment, issuer 109 may include a service provider, e.g., banks, financial institutions, etc., that may manage payment-related services between user 101 and merchants. In one example embodiment, issuer 109 may manage payment accounts on behalf of user 101, and may transmit payments for the goods and services purchased in that account. In another example embodiment, issuer 109 may manage recipient accounts on behalf of merchants, and merchants may receive payments for the goods and services rendered in that account.

In one embodiment, various elements of system 100 may communicate with each other through communication network 111. Communication network 111 may support a variety of different communication protocols and communication techniques. In one embodiment, communication network 111 allows authentication platform 113 to communicate with UE 103, issuer 109, and blockchain 115. The communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, authentication platform 113 may be a platform with multiple interconnected components. Authentication platform 113 may include one or more servers, intelligent networking devices, computing devices, components, and corresponding software for generating blockchain-based dynamic NFTs for user authentication. In addition, it is noted that authentication platform 113 may be a separate entity of system 100. Further details of authentication platform 113 are provided below.

In one embodiment, blockchain 115 may hold immutable information once data is committed to the chain, and it is therefore a decentralized, distributed, and immutable database in which data is logically structured as a sequence of smaller chunks (blocks). In one example embodiment, in blockchain 115, each block $B_{i>0}$ is immutably connected to a single preceding block $B_{i-1}$ through a cryptographic hash function $H(B_{i-1})$. Any changes to $B_{i-1}$ may yield an invalid hash in $B_i$ and all following blocks. The very first block $B_0$, the genesis block, is the only block without a predecessor. In one instance, to assure the integrity of a block and the data contained in it, respectively, the block may be digitally signed. In one example embodiment, as each transaction occurs, these transactions may be recorded as a block of data in blockchain 115. These blocks may form a chain of data as assets move from place to place or ownership changes hands. These blocks may confirm the exact time and sequence of transactions, and may link securely together to prevent any block from being altered or a block being inserted between two existing blocks. In one embodiment, each additional block may strengthen the verification of the previous block, thereby forming a protected blockchain. Blockchain 115 may be tamper-evident, delivering the key strength of immutability. This removes the possibility of tampering by a malicious actor and builds a ledger of transactions users can trust.

In one example embodiment, network participants, e.g., registered user 101, may have access to blockchain 115, and its immutable record of transactions. In such a shared ledger, transactions may be recorded only once, eliminating the duplication of records that is typical of traditional business networks. For example, participants may not change or tamper with a transaction after it has been recorded to blockchain 115. However, if a transaction record includes an error, a new transaction may be added to reverse the error, and both transactions are then visible. In one instance, to expedite transactions, a set of rules, e.g., smart contracts, may be stored on the blockchain and executed automatically. Due to transparency, proof of ownership, and traceable transactions in a blockchain network, NFTs may be created using blockchain technology, e.g., blockchain 115. In one embodiment, NFTs may be generated when blockchain 115 string records of cryptographic hash, a set of characters that verifies a set of data to be unique, onto previous records, therefore, creating a chain of identifiable data blocks. This cryptographic transaction process ensures the authentication of each digital file by providing a digital signature that is used to track NFT ownership.

In one embodiment, NFTs are non-fungible cryptographic assets that may be declared in a standard token format and may have a unique set of attributes. In one example embodiment, NFTs may be digital assets with unique identifiers that are stored on blockchain 115 and may not be substituted. In another example embodiment, NFTs may be digital representations of real-world objects or tradable rights of digital assets, e.g., pictures, virtual creations, audios, and other types of digital files, where the ownerships may be recorded in blockchain smart contracts. In one embodiment, NFTs may be tracked on blockchain 115 to provide the owner with proof of ownership.

In one embodiment, database 117 may be any type of database, such as relational, hierarchical, object-oriented, and/or the like, wherein data are organized in any suitable manner, including as data tables or lookup tables. In one embodiment, database 117 may store and manage multiple types of information that can provide means for aiding in the content provisioning and sharing process. In an embodiment, database 117 may include a machine-learning based training database with pre-defined mapping defining a relationship between various input parameters and output parameters based on various statistical methods. In an embodiment, the training database may include machine-learning algorithms to learn mappings between input parameters related to the user such as but not limited to financial transaction information, online activity information, historical user information and interests, contextual information, etc. In an embodiment, the training database may include a dataset that may include data collections that are not subject-specific, i.e., data collections based on population-wide observations, local, regional or super-regional observations, and the like. Exemplary datasets include retail data, market data, geographic data, business information, financial information, and the like. In an embodiment, the training database may be routinely updated and/or supplemented based on machine learning methods.

By way of example, UE 103, issuer 109, authentication platform 113, and blockchain 115 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
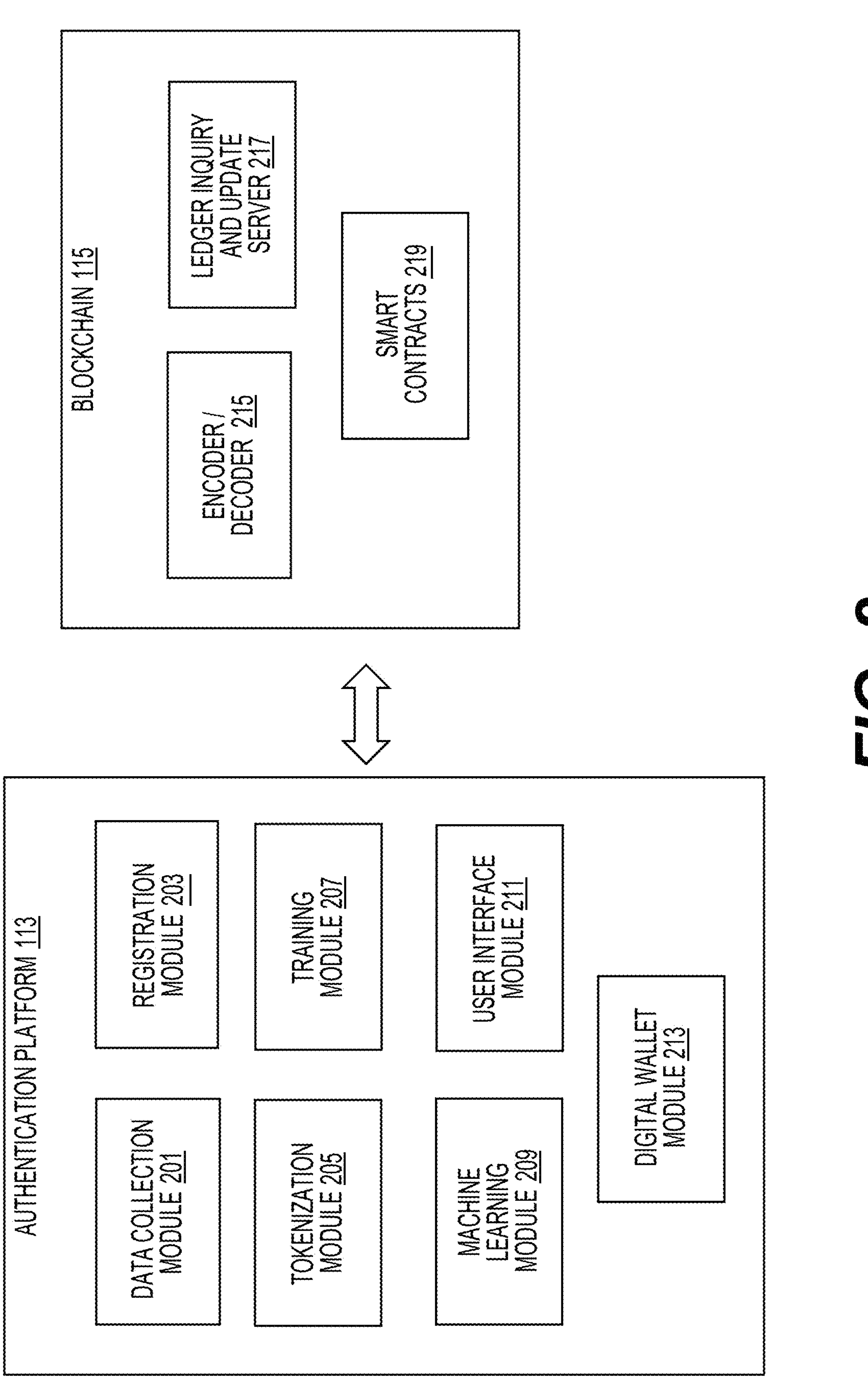
FIG. 2 is a diagram of the components of authentication platform 113 and blockchain 115, according to aspects of the disclosure.

FIG. 2 is a diagram of the components of authentication platform 113 and blockchain 115, according to one example embodiment. As used herein, terms such as "component" or "module" generally encompass hardware and/or software, e.g., that a processor or the like may use to implement associated functionality. By way of example, authentication platform 113 includes one or more components for generating blockchain-based dynamic NFTs for user authentication. It is contemplated that the functions of these components may be combined in one or more components or performed by other components of equivalent functionality. In one embodiment, authentication platform 113 comprises data collection module 201, registration module 203, tokenization module 205, training module 207, machine learning module 209, user interface module 211, and digital wallet module 213, or any combination thereof.

In one embodiment, data collection module 201 may automatically collect relevant data associated with user 101 through various data collection techniques. In one example embodiment, data collection module 201 may use a web-crawling component to access various databases, e.g., database 117, blockchain 115, etc., or other information sources to collect the relevant data, e.g., personal information, financial information, contextual information, etc., associated with user 101. Data collection module 201 may include various software applications, e.g., data mining applications in Extended Meta Language (XML), that automatically search for and return relevant data regarding user 101. Data collection module 201 may parse and arrange the data into a common format that can be easily processed by other modules and platforms. In another embodiment, data collection module 201 may collect, e.g., in real-time or near real-time, videos or one or more images of user 101 from sensor 107, e.g., image sensors, cameras, etc., to collect biometric data, e.g., fingerprints, facial images, etc.

In one embodiment, registration module 203 may authenticate and register user 101 and UE 103 for one or more services. In one example embodiment, authentication and registration may include a first-time registration process for establishing a user profile, e.g., system requesting various data from user 101 for identification purposes. Registration module 203 may receive user credentials from user 101 during the registration process with a service provider. Registration module 203 may authenticate the user credentials via various authentication mechanisms. In one embodiment, the authentication may be performed through the automated association of blockchain 115 and database 117 with an IP address, a carrier detection signal of UE 103, mobile directory number (MDN), subscriber identity module (SIM) (e.g., of a SIM card), radiofrequency identifier (RFID) tag or other device identifiers.

These means of authentication may reduce privacy concern related to data sharing services. Registration module 203 may register UE 101 and UE 103 upon successful authentication. In another embodiment, registration module 203 may comprise a logic configured to determine eligibility of user 101 based, at least in part, on historical user information. In one instance, historical user information may include credit history information, income information, debt-to-income ratio information, online fraud information, crime information, and the like.

In one embodiment, registration module 203 may transmit user credential information, e.g., biometric data, financial data, or any other sensitive information, etc., to tokenization module 205. Tokenization module 205 may tokenize user credential information by substituting sensitive information with a cryptographically generated token that has no relation to the sensitive information. Tokenization module 205 may generate, e.g., mint, any types of token, e.g., NFTs, a low-value token, a high-value token, a randomly generated number, a pseudorandom number, or other character sequences. In one embodiment, tokens are single-use tokens, multi-use tokens, and/or irreversible tokens. In one embodiment, tokenization module 205 may implement various mechanisms to generate these tokens, e.g., a mathematically reversible cryptographic function with a key, a nonreversible function such as a hash function, an index function or randomly generated number.

In one embodiment, tokenization module 205 may hash the token using, for example, a cryptographic hashing function. In another embodiment, tokenization module 205 may encrypt the tokens so that the tokens are not accessible to unauthorized parties, e.g., attackers. Encryption may be defined as the process of transforming data using an algorithm, e.g., cipher, to encrypted data unreadable to anyone except those possessing the password, e.g., a key. In one embodiment, tokenization module 205 may implement symmetric encryption algorithm mechanisms, asymmetric encryption algorithm mechanisms, or any other known encryption algorithm mechanisms to encrypt the tokens.

In one embodiment, training module 207 may provide supervised learning to machine learning module 209 by providing training data that contains input and correct output, to allow machine learning module 209 to learn over time. The training may be performed based on the deviation of a processed result from a documented result when the inputs are fed into machine learning module 209, e.g., an algorithm measures its accuracy through the loss function, adjusting until the error has been sufficiently minimized. In one embodiment, training data may include user credentials, e.g., sample biometric data, sample image data, sample video data, sample credential data, etc. Each set of training data may thus include sample biometric data, sample image data, sample video data, and sample credential data, for training machine learning module 209 to authenticate user 101 and/or to encode sample data into NFTs for storage into blockchain 115. Training module 207 may conduct the training in any suitable manner, e.g., in batches, and may include any suitable training methodology. Training may be performed periodically, and/or continuously, e.g., in real-time or near real-time.

In one embodiment, machine learning module 209 may receive the training data from training module 207. Machine learning module 209 may randomize the ordering of the training data, visualize the training data to identify relevant relationships between different variables, identify any data imbalances, split the training data into two parts where one part is for training a model and the other part is for validating the trained model, de-duplicating, normalizing, correcting errors in the training data, and so on. Machine learning module 209 may implement various machine learning techniques, e.g., decision tree learning, association rule learning, neural network (e.g., recurrent neural networks, convolutional neural networks, deep neural networks), inductive programming logic, support vector machines, Bayesian models, etc. In another embodiment, machine learning module 209 may leverage one or more classification models trained to classify the training data and/or one or more prediction models trained to predict an outcome based on the training data. For example, machine learning module 209 may input the training data to classification models and/or prediction models to authenticate user 101 and/or to encode sample data into NFTs for storage into blockchain 115. Machine learning module 209 may use outcomes.

In one embodiment, user interface module 211 may enable a presentation of a graphical user interface (GUI) in UE 103. User interface module 211 may employ various application programming interfaces (APIs) or other function calls corresponding to application 105 on UE 103, thus enabling the display of graphics primitives such as icons, menus, buttons, data entry fields, etc. In another embodiment, user interface module 211 may cause interfacing of guidance information with user 101 to include, at least in part, one or more annotations, audio messages, video messages, or a combination thereof. In one example embodiment, user interface module 211 may display a login widget in UE 103, and the login widget may be linked to the computing system of the service providers, e.g., issuer 109. User interface module 211 may ensure that the login widget is distinctive to be recognized by users 101 and unobtrusive to avoid any negative user experiences while registering with the services. In a further example embodiment, user interface module 211 may comprise a variety of interfaces, for example, interfaces for data input and output devices, referred to as I/O devices, storage devices, and the like. Still further, user interface module 211 may be configured to operate in connection with augmented reality (AR) processing techniques, wherein various applications, graphic elements, and features may interact.

In one embodiment, digital wallet module 213 may provide digital wallet service(s), e.g., offer to enroll in a digit wallet service, exchange NFTs stored in the digital wallet, make payments using the digital wallet service, etc., to user 101. In one embodiment, issuer 109 may integrate the digital wallet interface provided by digital wallet module 213 to display the digital wallet interface on a web browser or UE 103 associated with user 101 or a service provider, e.g., merchant. In one instance, user 101 may utilize the digital wallet interface to perform various e-commerce transactions.

In one embodiment, blockchain 115 comprises encoder/decoder 215, ledger inquiry and update server 217, and smart contract 219, or any combination thereof. In one embodiment, blockchain 115 may encrypt data stored in blockchain 115, via encoder/decoder 215, to provide security and/or protect sensitive information. In some embodiments, the latest data stored in blockchain 115 may be periodically or continually retrieved by authentication platform 113 to make it accessible to interested parties, e.g., user 101 via UE 103. In such embodiments, blockchain 115 may decode data stored in blockchain 115, via encoder/decoder 215. Embodiments of encoder/decoder 215 are not limited to these examples and may include other suitable functionality in other embodiments.

In one embodiment, ledger inquiry and update server 217 may be one or more of an application, application program interface, software, hardware, server, or protocol that allows the addition of data, e.g., a new attribute or a detail regarding an attribute of a transaction, to blockchain 115. In some embodiments, ledger inquiry and update server 217 may further enable the access or retrieval of data for any attribute of the transaction information from blockchain 115. In one embodiment, ledger inquiry and update server 217 may respond to requests to add attributes of a transaction, dispute one or more of the previously posted data for the transaction attribute, adding a proposed modification to an existing transaction attribute, e.g., for initiating a dispute, or to a data of an existing transaction attribute, and/or search for or retrieve details regarding a transaction attribute, e.g., data stored for the attribute.

In one embodiment, smart contract 219 may be one or more of an application, application program interface, software, hardware, server, or computerized transaction protocol that facilitates, verifies, and/or enforces the negotiation or performance of a contract. In various embodiments presented herein, the contract is configured to govern the transaction between user 101 and issuer 109. In one embodiment, authentication platform 113 may provide a simplified KYC process for user 101 and issuer 109 via smart contract interactions.

The above presented modules and components of authentication platform 113 may be implemented in hardware, firmware, software, or a combination thereof. Though depicted as a separate entity in FIG. 2, it is contemplated that authentication platform 113 may be implemented for direct operation by respective UE 103. As such, authentication platform 113 may generate direct signal inputs by way of the operating system of the UE 103. In another embodiment, one or more of the modules 201-213 may be implemented for operation by respective UEs, as authentication platform 113, or a combination thereof. The various executions presented herein contemplate any and all arrangements and models.

Figure 3:
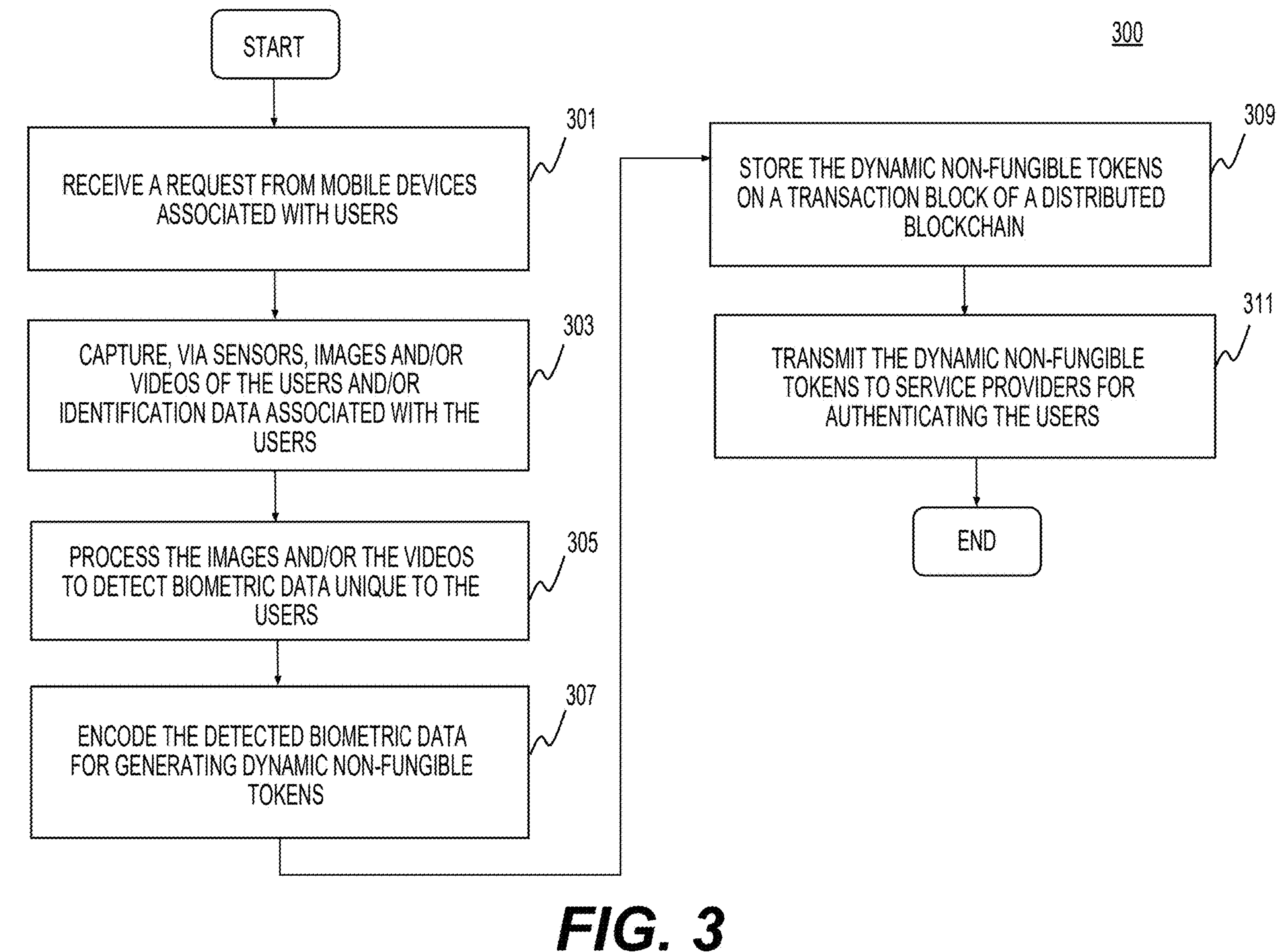
FIG. 3 is a flowchart of a process for generating blockchain-based dynamic NFTs for user authentication, according to aspects of the disclosure.
Figure 7:
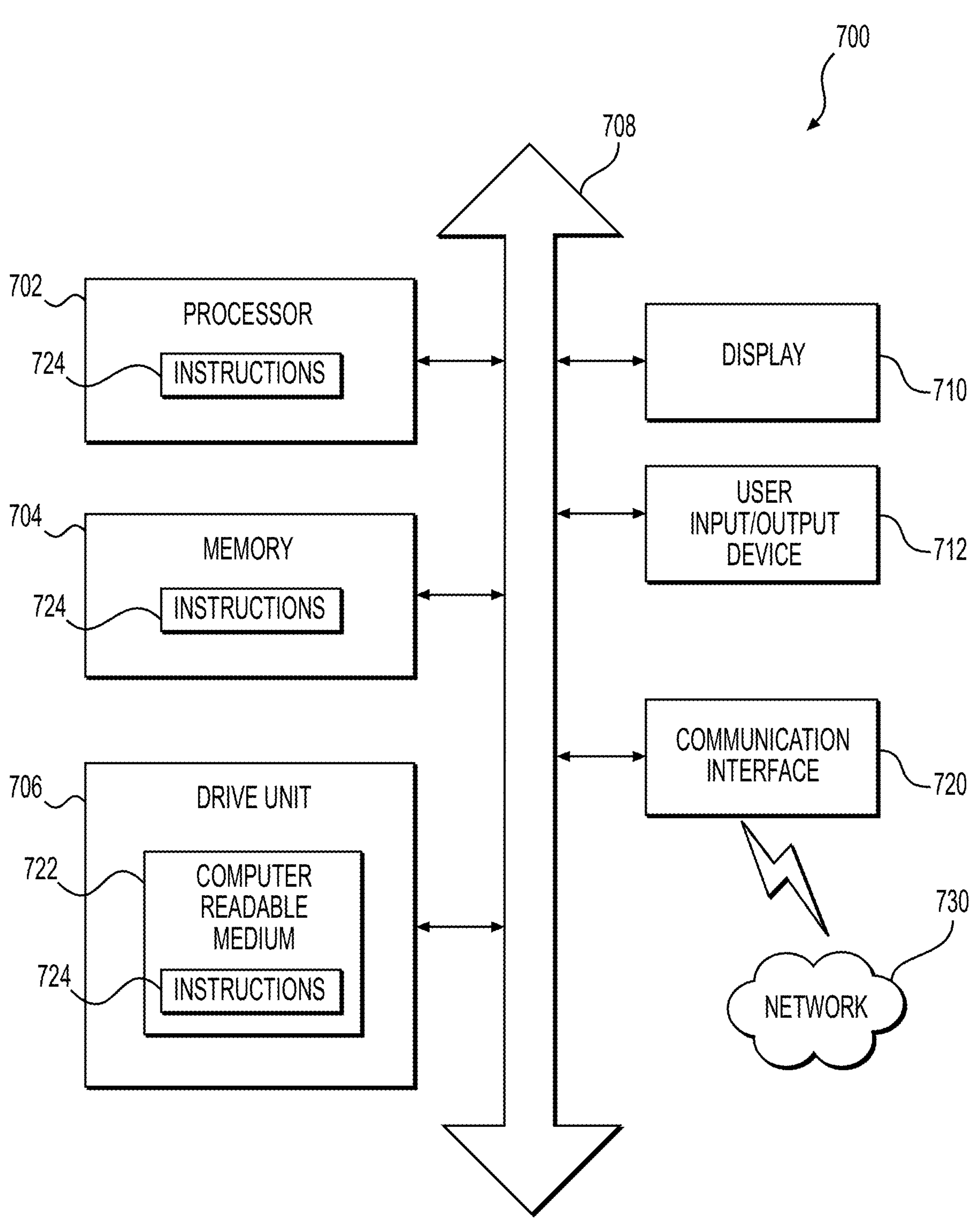
FIG. 7 illustrates an implementation of a general computer system that may execute techniques presented herein.

FIG. 3 is a flowchart of a process for generating blockchain-based dynamic NFTs for user authentication, according to one example embodiment. In various embodiments, authentication platform 113 and/or any of modules 201-213 may perform one or more portions of process 300 and may be implemented in, for instance, a chip set including a processor and a memory as shown in FIG. 7. As such, authentication platform 113 and/or any of modules 201-213 may provide means for accomplishing various parts of process 300, as well as means for accomplishing embodiments of other processes described herein in conjunction with other components of system 100. Although process 300 is illustrated and described as a sequence of steps, it is contemplated that various embodiments of process 300 may be performed in any order or combination and need not include all of the illustrated steps.

In step 301, authentication platform 113 may receive a request from UE 103, e.g., mobile devices, associated with user 101. In one example embodiment, user 101 may send a request to authentication platform 113 to register for an online service, e.g., creating a user profile to access a banking service.

In step 303, authentication platform 113 may capture, via sensors 107, images and/or videos of user 101, identification data associated with user 101, or a combination thereof. In one example embodiment, sensors 107, e.g., cameras of UE 103, may capture a series of images and/or videos of user 101, e.g., the face of user 101. In another example embodiment, sensors 107 may capture images and/or videos of identification data associated with user 101, e.g., driver's license, passport, or any other identification documents. In one embodiment, authentication platform 113 may verify, via sensors 107, the orientation of the UE 103, proximity of the UE 103 to users 101, or a combination thereof based, at least in part, on a threshold level. Authentication platform 113 may generate a notification in a user interface of UE 103 upon determining the orientation of UE 103, the proximity of UE 103 to user 101, or a combination thereof has exceeded the threshold level.

In another example embodiment, sensors 107 may receive personal information of user 101, e.g., location information, bank account information, or any personal information, etc., via the user interface of UE 103. In another example embodiment, sensors 107, e.g., biometric sensors, may receive biometric data of user 101.

In step 305, authentication platform 113 may process the images and/or the videos to detect biometric data unique to user 101. In one embodiment, the biometric data includes iris patterns, eye color, facial details, hand geometry, a fingerprint, or a combination thereof. In one example embodiment, authentication platform 113 may process the captured image to detect facial details unique to user 101. In another example embodiment, authentication platform 113 may process the received biometric data to detect fingerprint(s) unique to user 101. In another example embodiment, authentication platform 113 may process the received identification data to detect confidential data unique to user 101.

In step 307, authentication platform 113 may encode the detected biometric data for generating dynamic NFTs. In one embodiment, encoding the detected biometric data may include: (i) cryptographically hashing each of the detected biometric data, (ii) concatenating each of the hashed biometric data in a pre-defined order, (iii) generating and storing a singular hash representing the concatenated individual hashes, and (iv) generating the dynamic NFTs representing the singular hash. In one embodiment, authentication platform 113 may mint, on the distributed blockchain 115, the dynamic NFTs. In one embodiment, minting an NFT may include validating the NFT, creating a new block, and recording the NFT into blockchain 115. The NFT may be recorded onto the blockchain through a "proof of stake" protocol. Proof of stake is a blockchain consensus mechanism used to validate online transactions, e.g., cryptocurrency transactions.

In step 309, authentication platform 113 may store the dynamic NFTs on a transaction block of distributed blockchain 115. Authentication platform 113 may receive a blockchain address and a verification that the transaction block is recorded in distributed blockchain 115. Authentication platform 113 may monitor, in real-time or near real-time, distributed blockchain 115 and a transaction on the distributed blockchain matching the address of distributed blockchain 115. In one embodiment, authentication platform 113 may hold the dynamic NFT in a first digital wallet of a blockchain network, wherein the first digital wallet may generate a private key. In one embodiment, the dynamic NFTs may be associated with a programmatically defined smart contract written to distributed blockchain 115.

In one embodiment, authentication platform 113 may update metadata associated with at least one dynamic NFT based, at least in part, on the monitoring. Authentication platform 113 may generate a new dynamic NFT based, at least in part, on the updated metadata. Authentication platform 113 may concatenate the new dynamic NFT in a pre-defined order, wherein the pre-defined order includes connecting the new dynamic NFT to a preceding dynamic NFT on the transaction block of distributed blockchain 115.

In step 311, authentication platform 113 may transmit or exchange the dynamic NFTs to a plurality of service providers, e.g., issuer 109 or merchants, for authenticating user 101. In one embodiment, authentication platform 113 may receive, via UE 103, a second request for processing the dynamic NFTs on the transaction block of distributed blockchain 115 from users 101, wherein the second request includes transmitting the dynamic non-fungible tokens to the plurality of service providers. Authentication platform 113 may transmit the dynamic non-fungible tokens from the first digital wallet to a second digital wallet of the blockchain network, wherein the second digital wallet is associated with the plurality of service providers. In one embodiment, the at least one second request identifies the dynamic non-fungible tokens by a content identification, a path identification, or a combination thereof.

FIGS. 4A-4M are user interface diagrams that illustrate a simple one-time registration process for an online service, according to one example embodiment. Although the user interface diagrams are illustrated and described in sequence, it is contemplated that various embodiments of these diagrams may be performed in any order or combination and need not include all of the illustrated sequences. In this example embodiment, a user is registering for an online banking service, however, it is understood that the user may register for any online services.

Figure 4A:
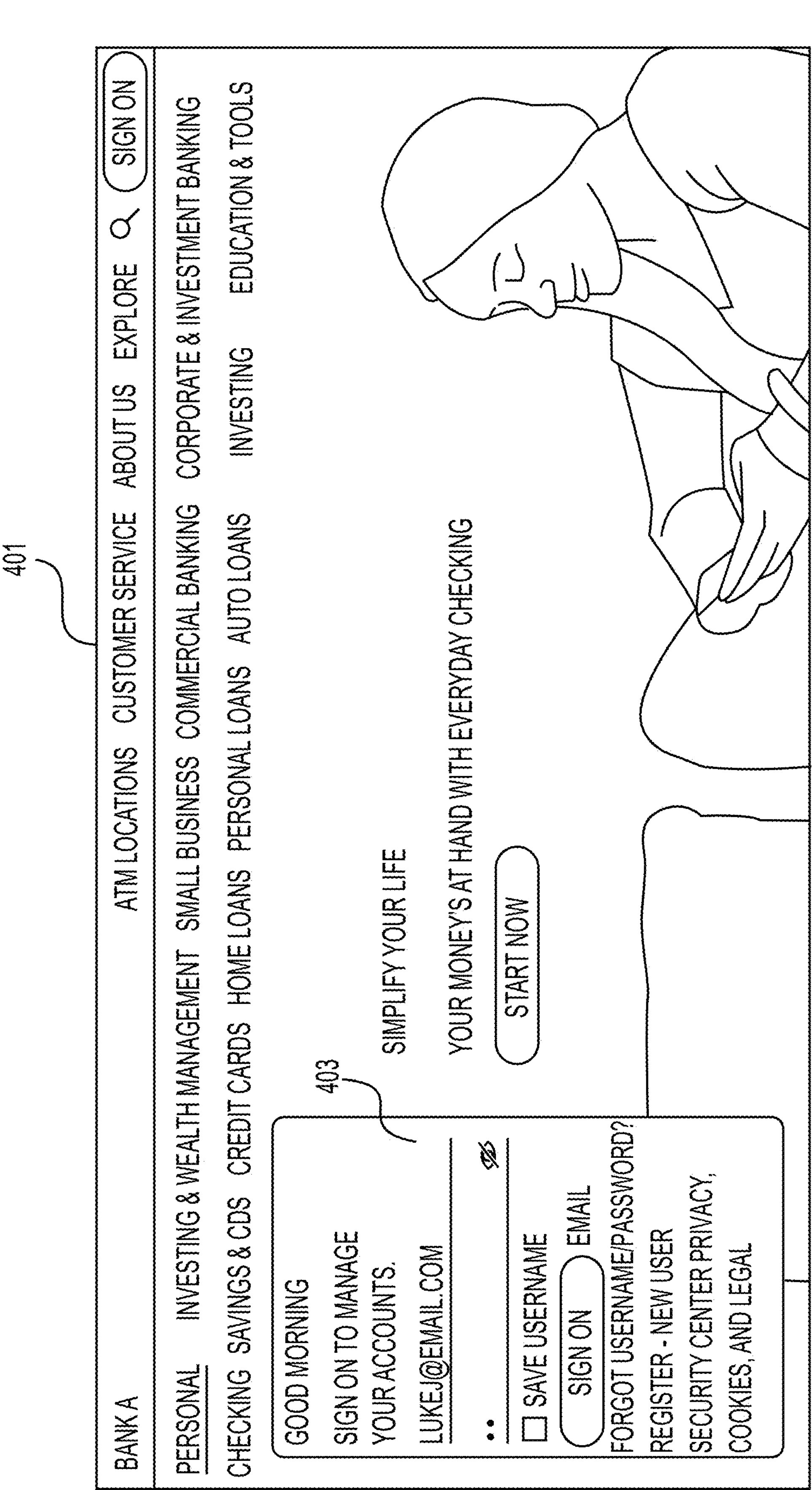
FIGS. 4A-4M are user interface diagrams that illustrate a simple one-time registration process for an online service, according to aspects of the disclosure.

FIG. 4A illustrates a main entry screen for an online service, e.g., an online financial service of Bank A. The entry screen 401 may include a plurality of icons that may be invoked to perform different functions. In one embodiment, user 101 may be presented with user interface element 403 that request login credentials. In one example embodiment, new user 101 may select to register with the online financial service by interacting with user interface element 403, whereupon new user 101 is navigated to FIG. 4B. In another example embodiment, registered user 101 may enter their credentials and may be navigated to FIG. 4B to simplify their login process.

Figure 4B:
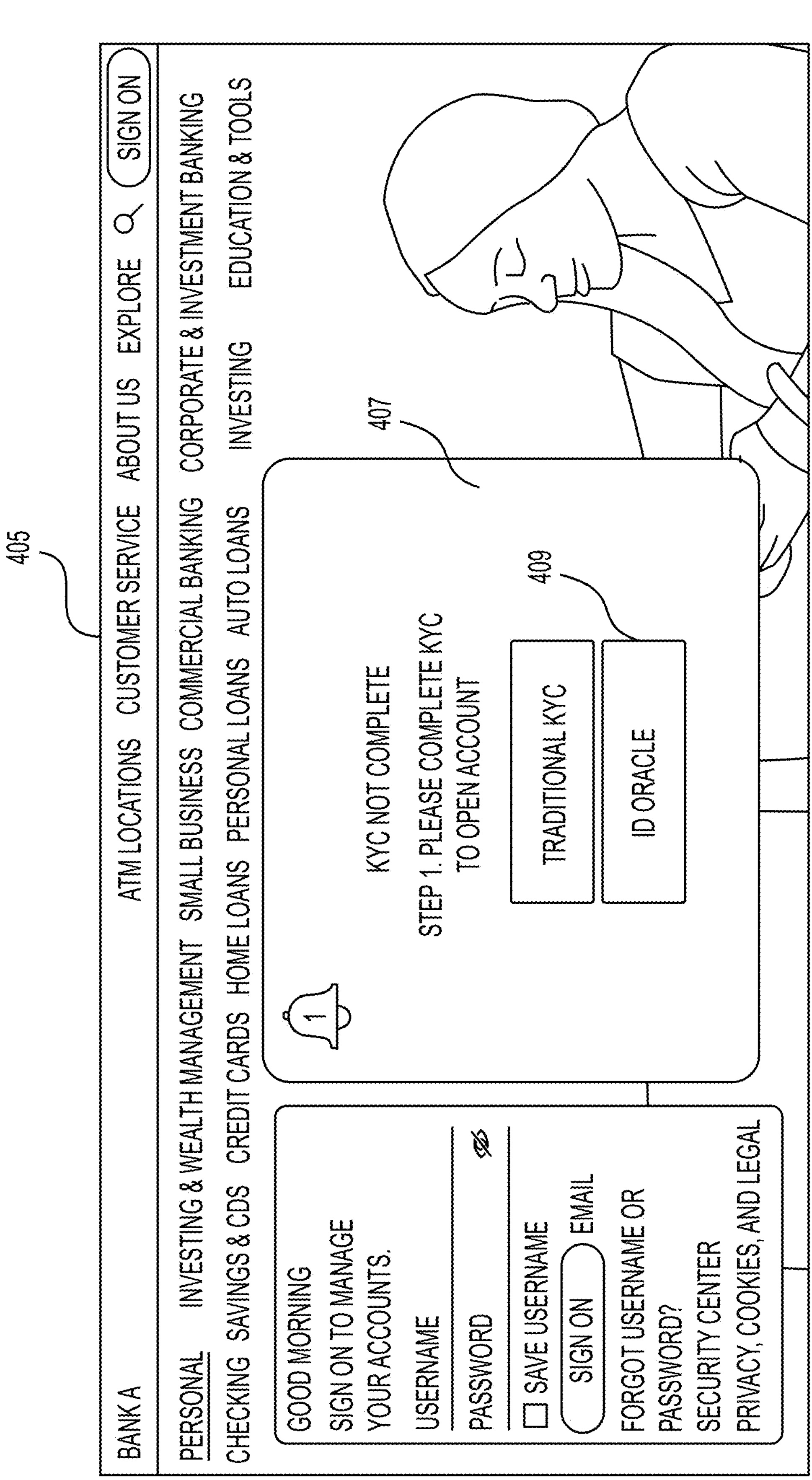
Figure 4C:
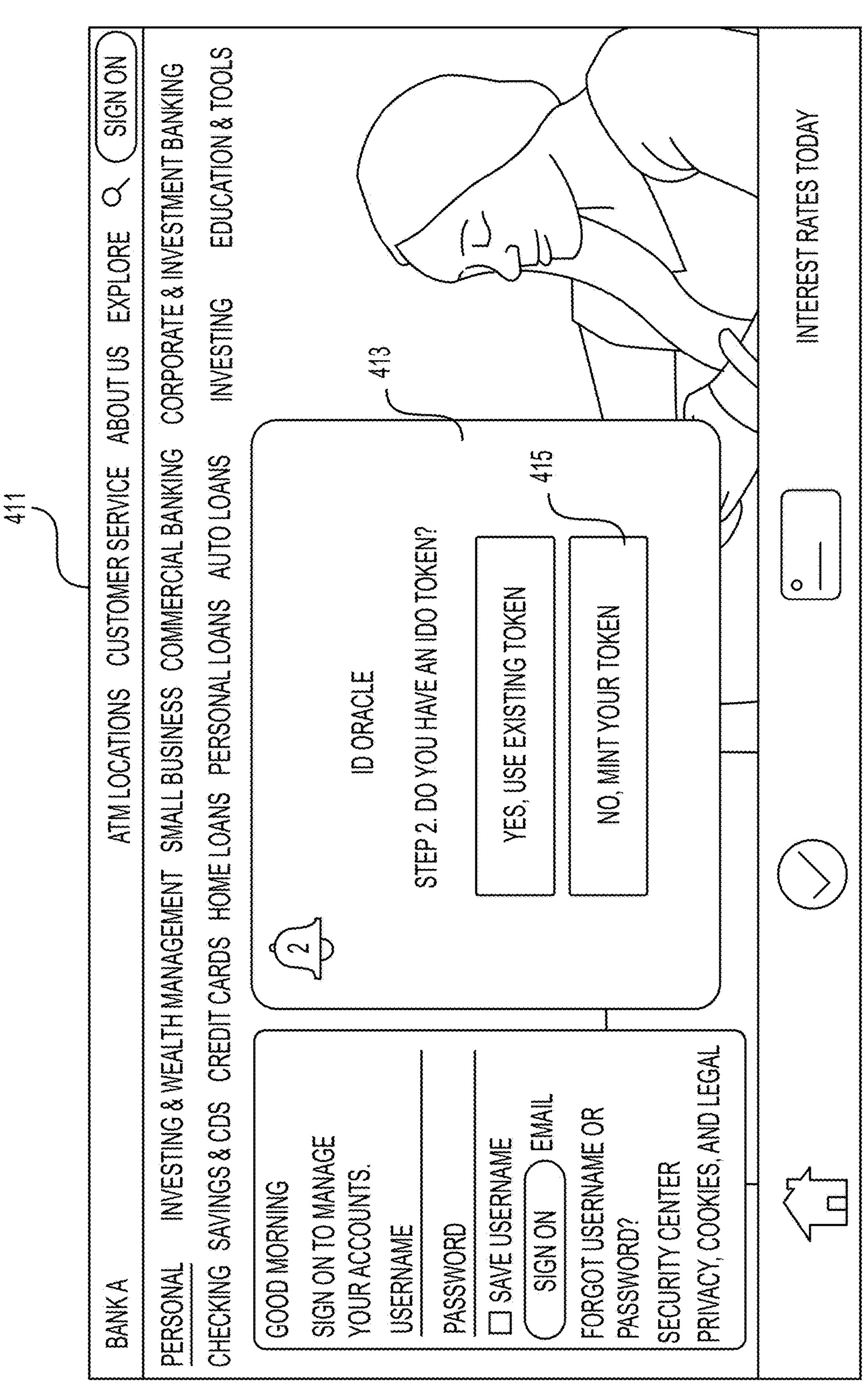

In FIG. 4B, screen 405 may include a user interface element 407, e.g., a KYC registration tab. User 101 may select ID Oracle tab 409 from user interface element 407 to initiate the KYC registration process, whereupon user 101 may be directed to screen 411 of FIG. 4C. Screen 411 may include user interface element 413 for using an existing token or to initiate a minting of tokens. In this instance, user 101 chooses to mint the tokens by selecting user interface element 415. The user is then navigated to screen 417 of FIG. 4D to authenticate the user.

Figure 4D:
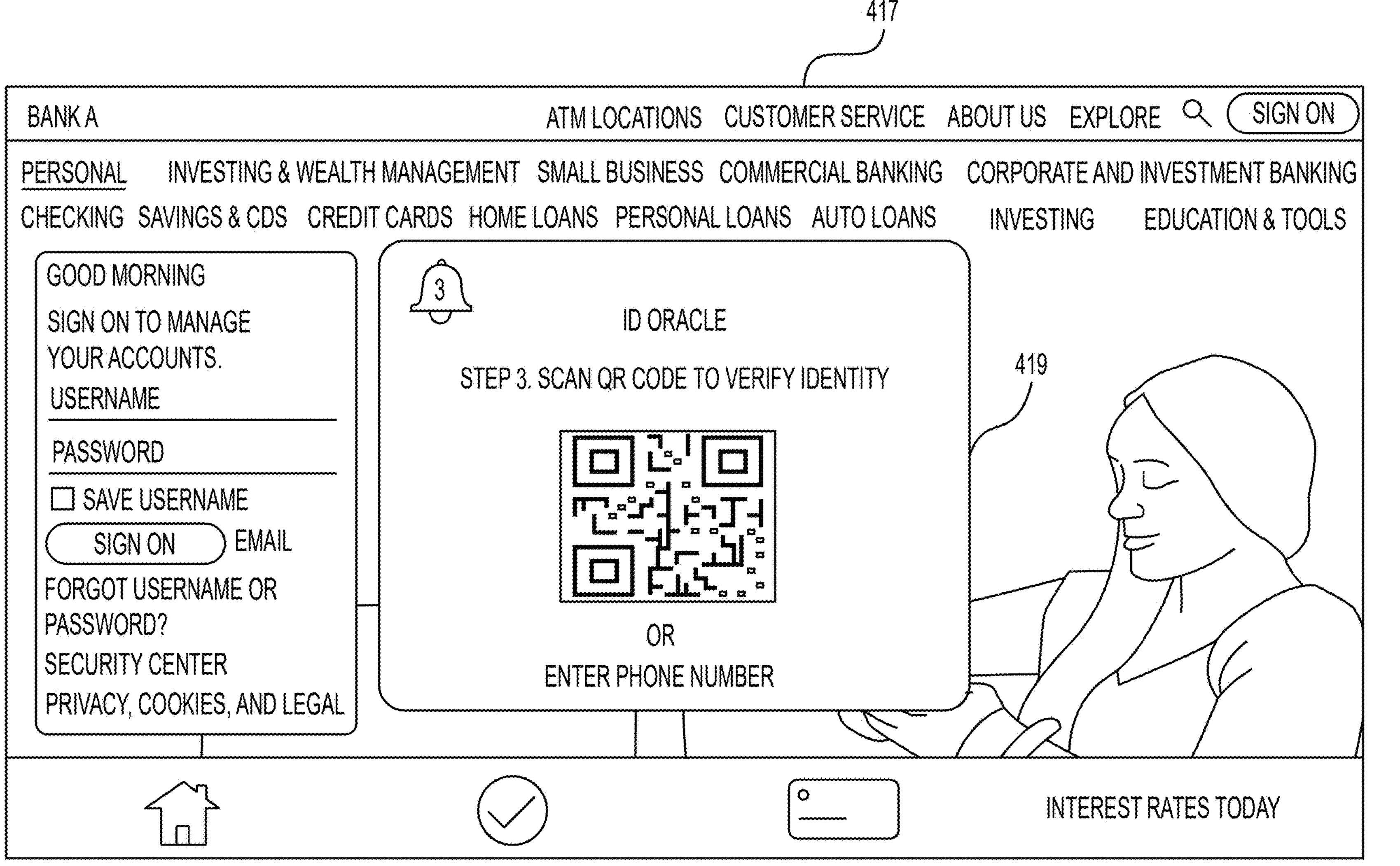
Figure 4E:
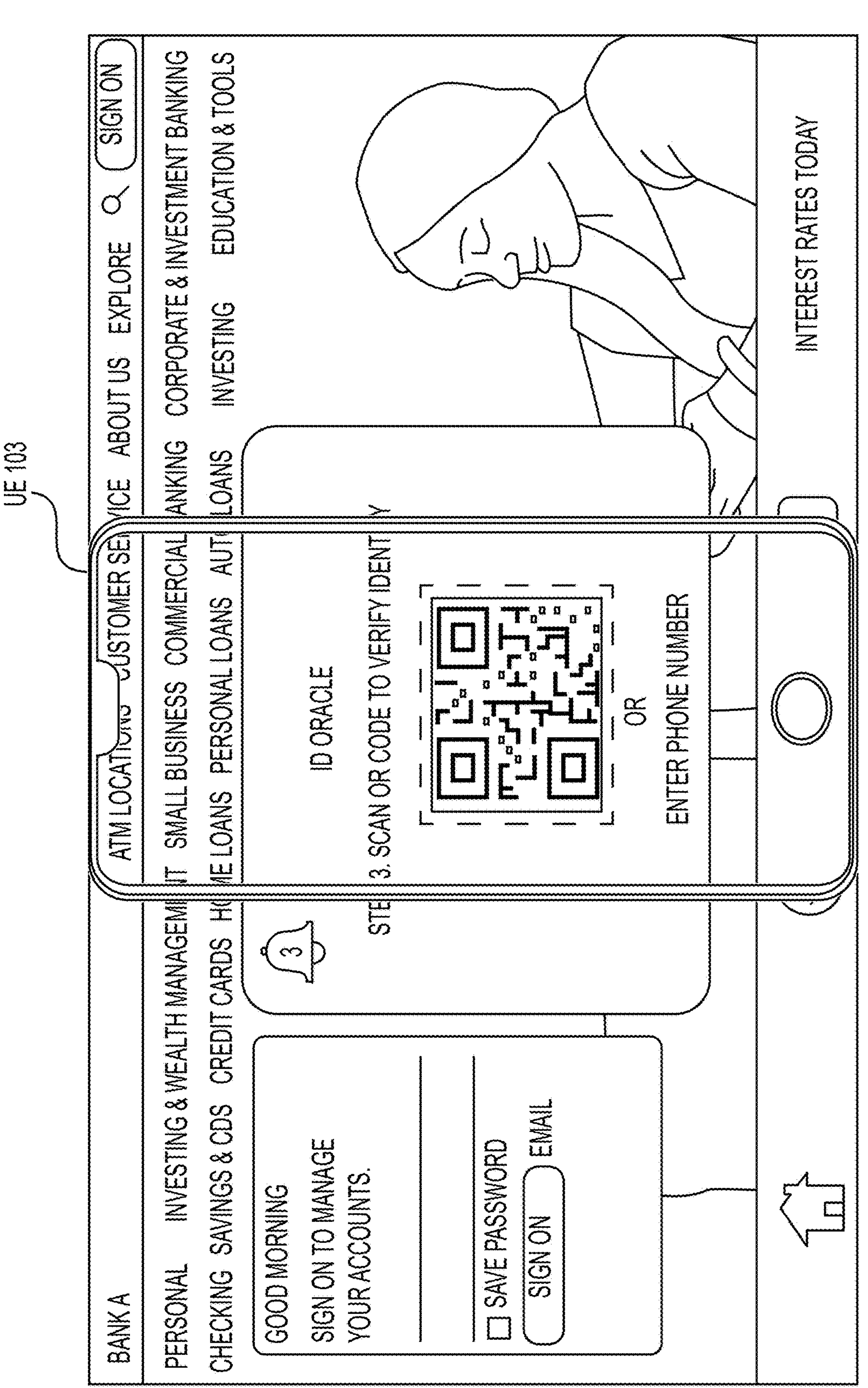

In FIG. 4D, screen 417 generates notification 419, requesting user 101 to either scan the QR code or enter a phone number. In this instance, the user may scan the QR code via sensors 107, e.g., camera, of UE 103 (as represented in FIG. 4E), and user 101 may be navigated to a website to authorize the registration process. In another instance, user 101 may enter a phone number, and user 101 may receive a URL as a text message. User 101 may tap the URL to approve the registration process. It is understood that any other verification mechanisms may be used.

Figure 4F:
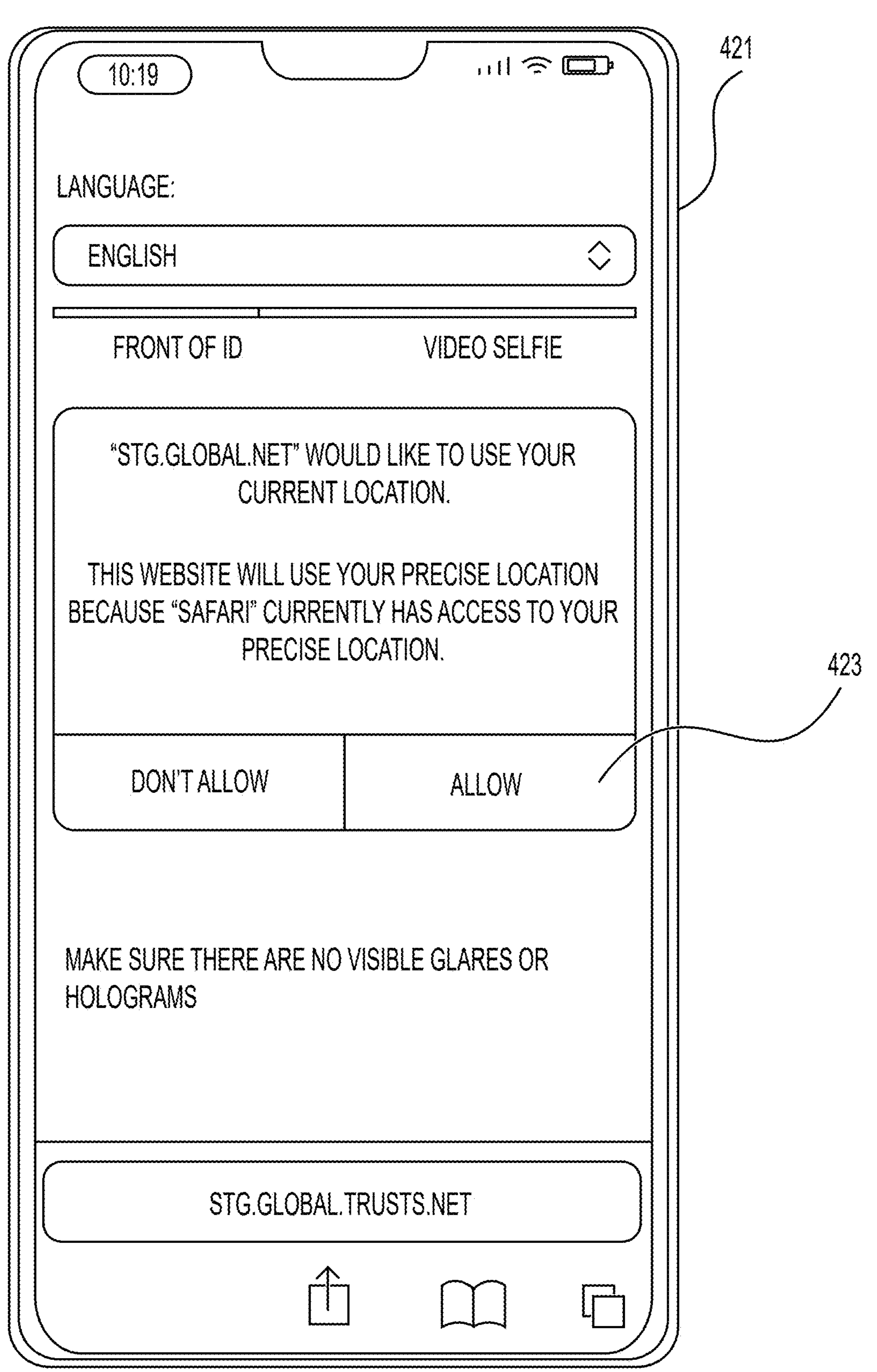

In FIG. 4F, display 421 may generate notification requesting access to the current location of user 101. User 101 may grant access to location information by clicking user interface element 423. In one embodiment, the current location of the user may be used for location-based verification in the future, e.g., authentication platform 113 may compare the future location(s) of user 101 with this stored location.

Figure 4G:
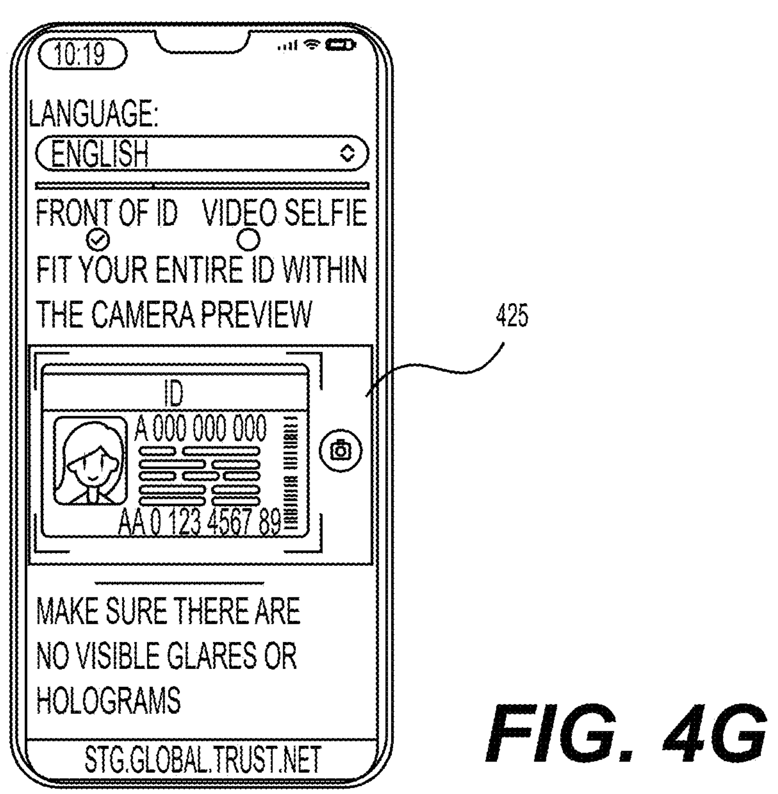
Figure 4H:
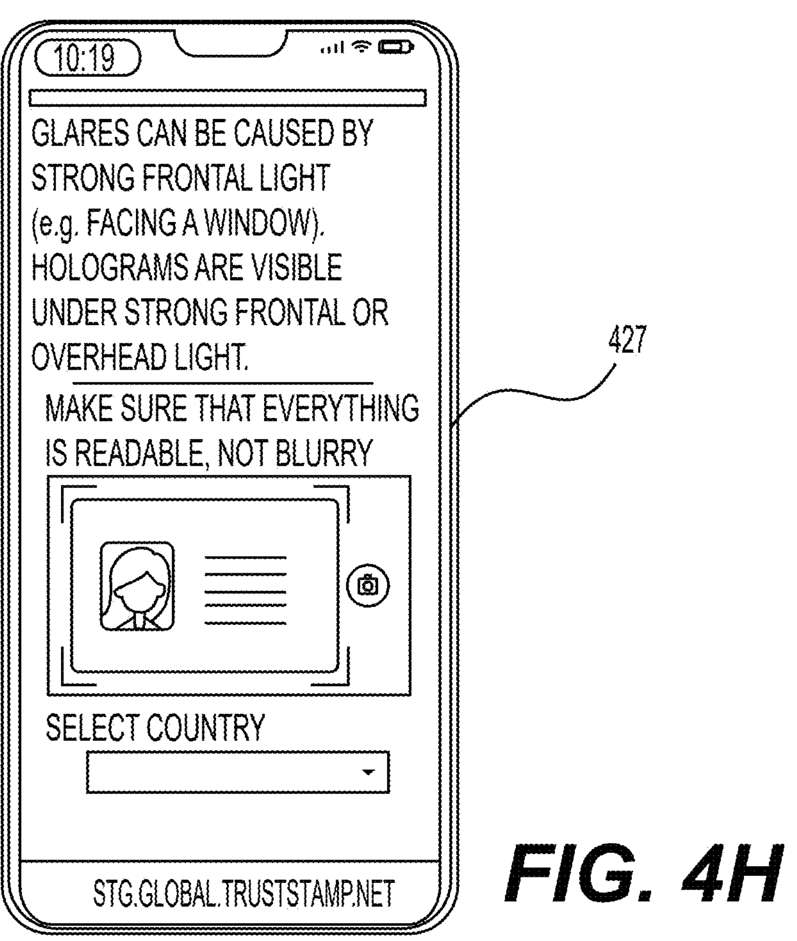

FIGS. 4G and 4H are user interface diagrams that represent a presentation of instructions to user 101 to properly align an identification card, e.g., driver's license, within displays 425 and 427 of UE 103. Once user 101 properly aligns the identification card within displays 425 and 427, the camera or webcam directed at the identification card may capture images or video of the identification card.

Figures 4I, 4J:
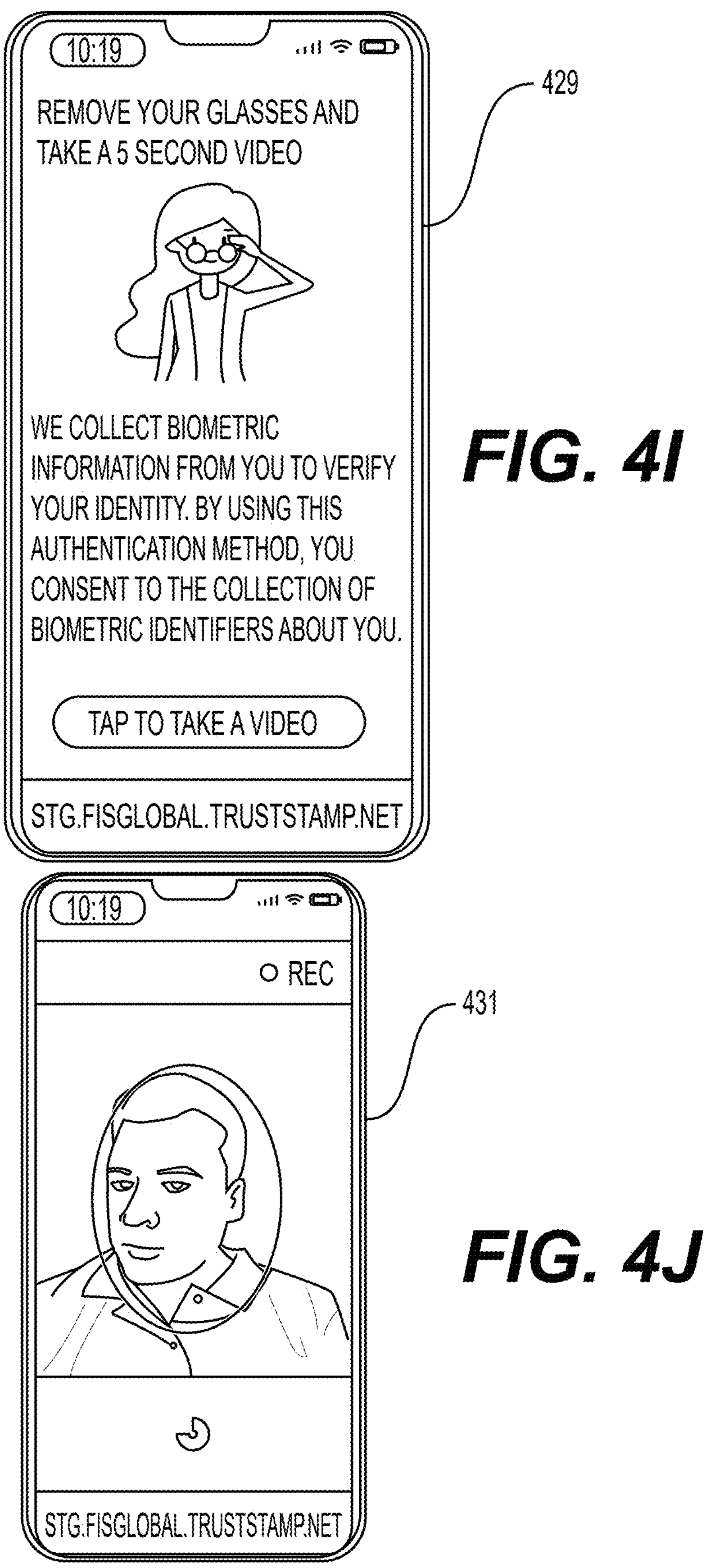
Figure 4K:
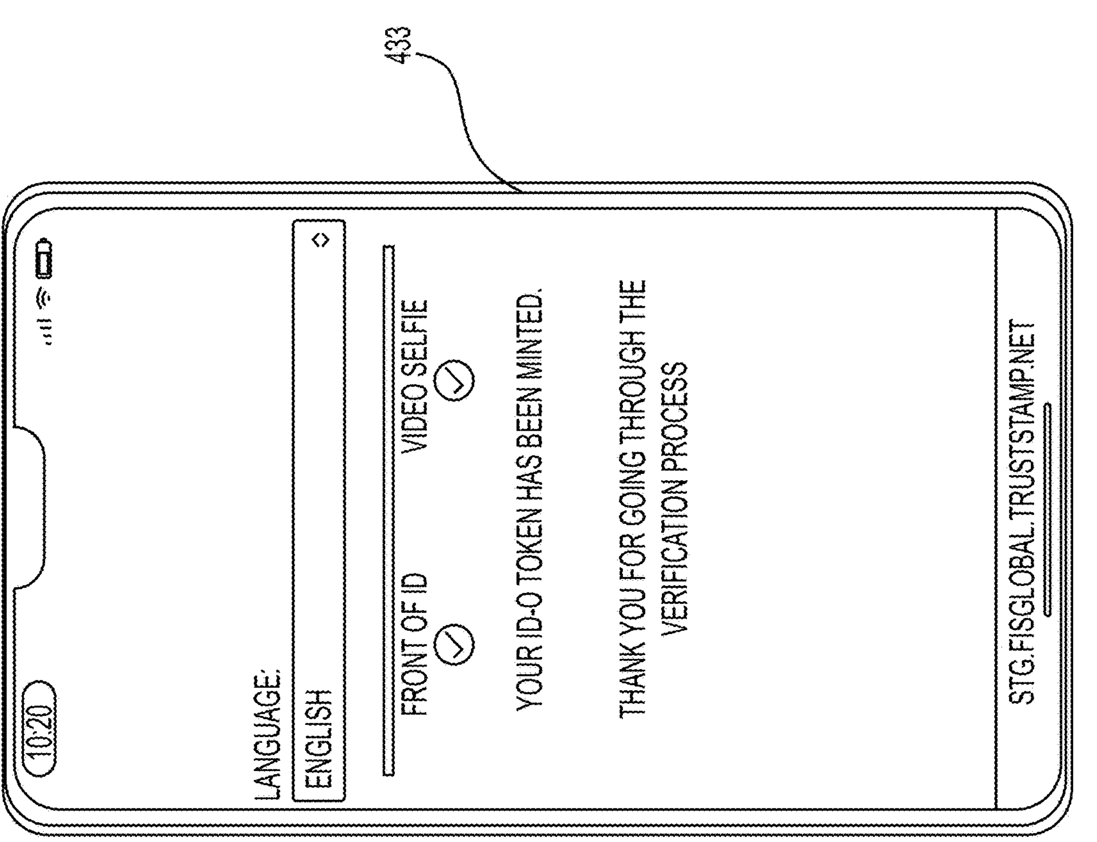
Figure 4L:
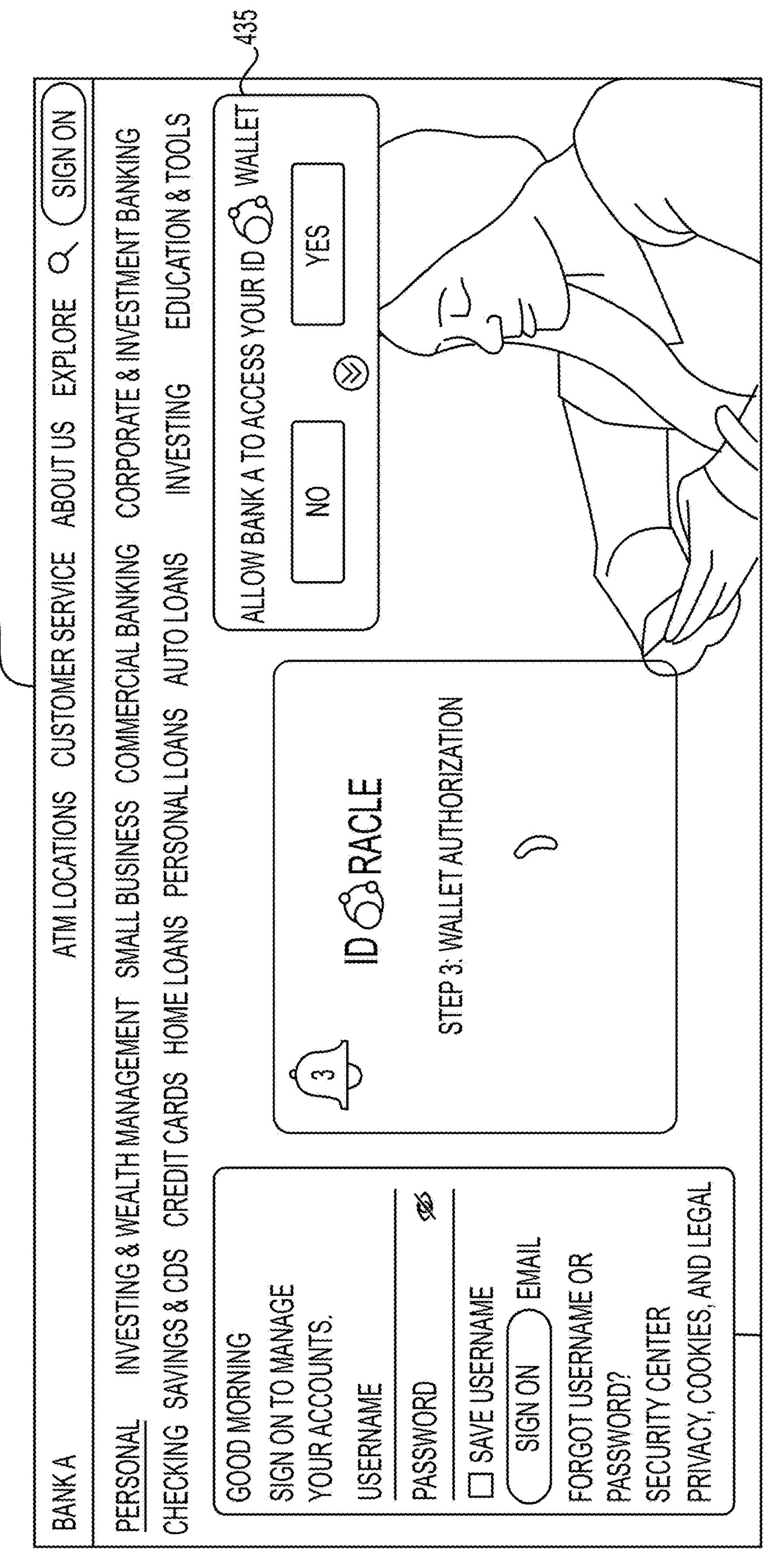
Figure 4M:
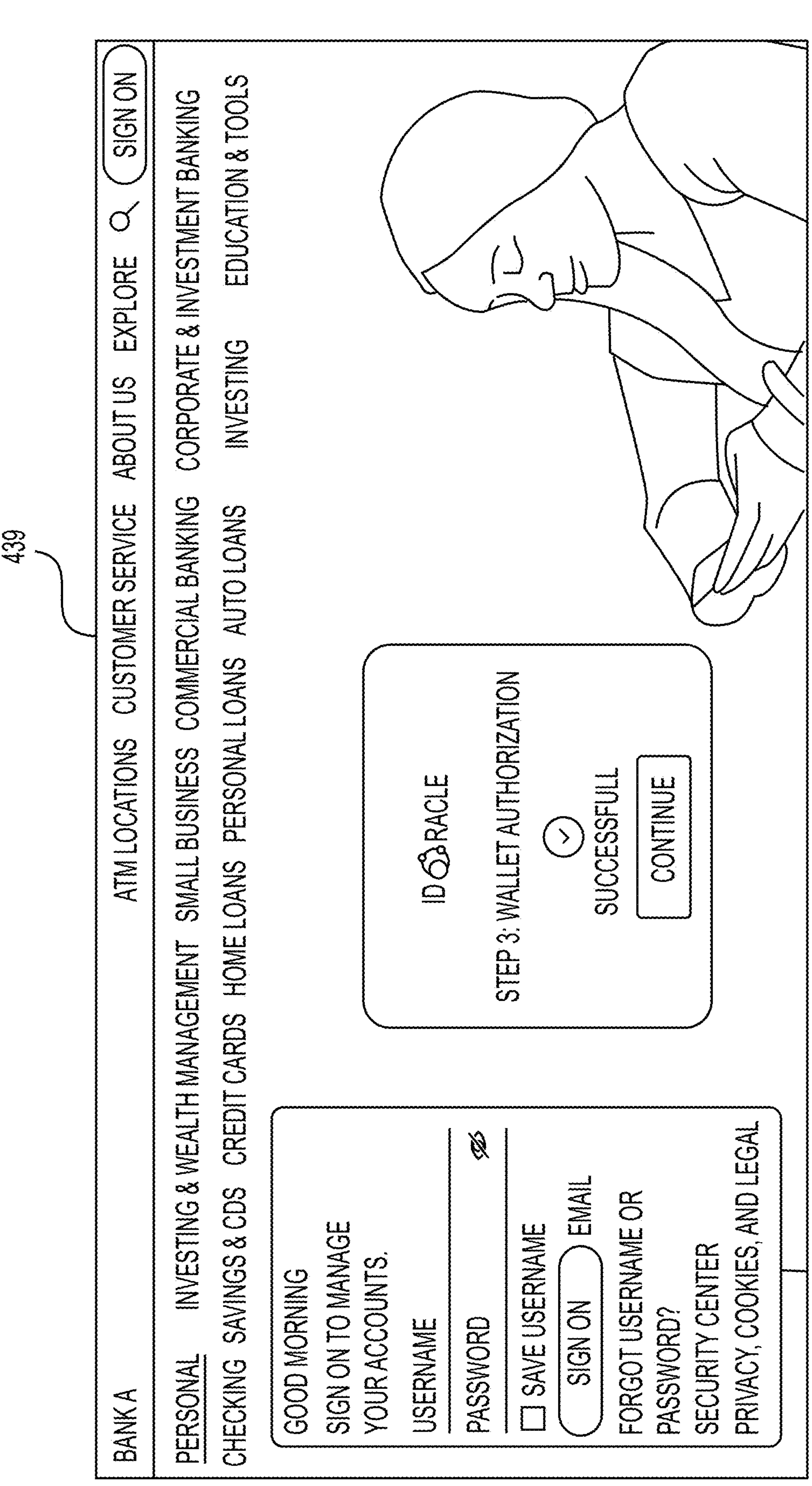

FIGS. 4I and 4J are user interface diagrams that represent a presentation of instructions to user 101 to place their face in certain positions while the camera or webcam captures a plurality of images or a video of the user's face. In an exemplary embodiment, UE 103 may instruct the user to move their head to precise locations or just request that they approximate a movement shown to them on displays 429 and 431. In an exemplary embodiment, authentication platform 113 may run a face detection algorithm to analyze the image data or video data to ensure the user's face is properly captured. Authentication platform 113 upon determining interference or occlusion in the images or videos may generate an alert requesting user 101 to re-acquire a new set of images or videos. Once all the requirements for registration are complete, user 101 may be notified that the token has been minted, and the user may utilize the token for any future transaction with any of the participating service providers (as illustrated in display 433 of FIG. 4*k*). In one embodiment, authentication platform 113 with one or more of the modules 201-213 may process the location data, identification data, and biometric data of user 101 to generate a blockchain-based dynamic NFTs for user authentication. For example, the identities of user 101 may be stored on a private blockchain as NFTs, thereby removing the need for issuer 109 to store, process, and maintain on their own infrastructure. If there are changes to a user's identity information, the NFT may be updated dynamically by the user. Such dynamic refresh allows issuer 109 to meet regulatory requirements.

In one embodiment, once the NFTs are generated and stored in blockchain 115 by authentication platform 113, the service provider, e.g., Bank A, may request user 101 for access to the blockchain wallet, e.g., a digital wallet, which comprises the stored NFTs. As illustrated, pop-up 435 in the right corner of user interface 437 may be a blockchain wallet in the form of a browser extension. In one instance, a request for wallet access may also be presented via application 105 in UE 103. In one embodiment, user 101 may grant access to the blockchain wallet, and the service provider may perform token verification. The identity of user 101 is verified once Bank A successfully verifies the NFTs. A successful wallet authorization and NFT verification may result in display 439 of FIG. 4M. Such successful NFT verification may result in a simple and secure login process for all future transactions for user 101 with Bank A.

FIGS. 5A-5F are user interface diagrams that illustrate a scenario wherein different service providers are authenticating users with the previously generated blockchain-based dynamic NFTs, according to one example embodiment. Although the user interface diagrams are illustrated and described in sequence, it is contemplated that various embodiments of these diagrams may be performed in any order or combination and need not include all of the illustrated sequences. In this example embodiment, a user is registering for an online banking service, however, it is understood that the user may register for any online services.

Figure 5A:
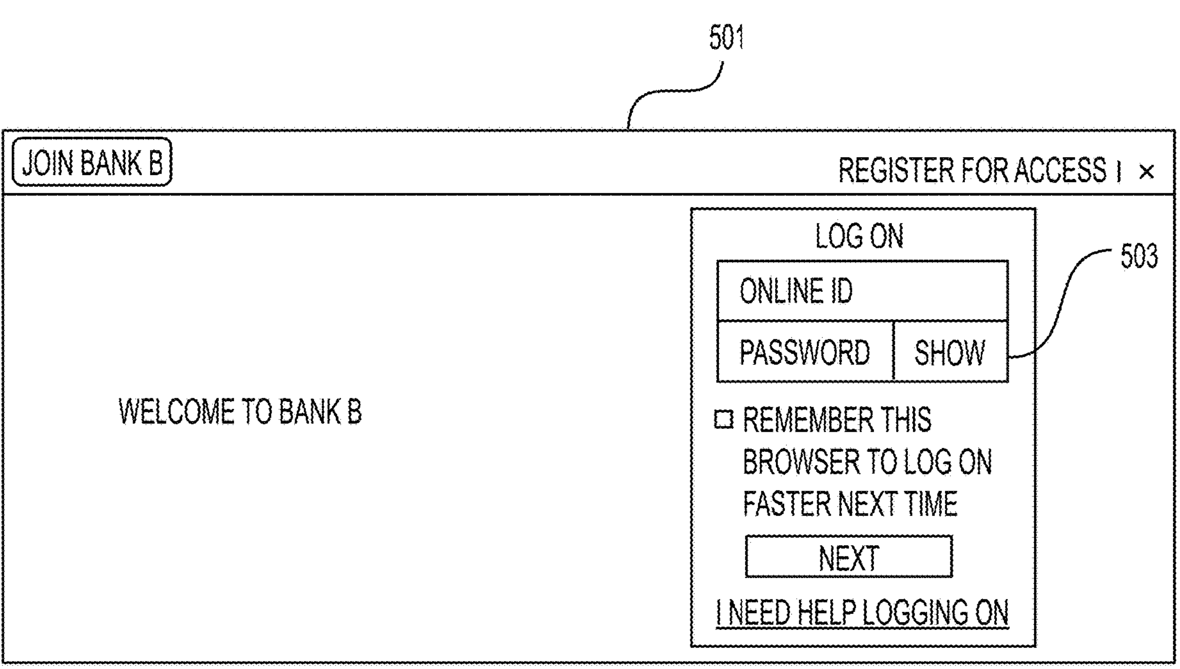
FIGS. 5A-5F are user interface diagrams that illustrate a scenario wherein different service providers are authenticating users with the previously generated blockchain-based dynamic NFTs, according to aspects of the disclosure.

FIG. 5A illustrates a main entry screen for banking-related services of Bank B. The entry screen 501 may display user interface element 503 that request login credentials for returning users or a registration request for potential users. In one embodiment, when user 101 is trying to access a service of Bank B, authentication platform 113 may notify Bank B that user 101 has blockchain-based NFTs as a means of verification. For example, authentication platform 113 may notify member service providers regarding blockchain-based NFTs verification for user 101 in real-time, near real-time, per schedule, etc. In another embodiment, authentication platform 113 may process historical information of user 101, e.g., online activities, to identify service providers of interest, and may alert the identified service providers regarding blockchain-based NFTs verification for user 101.

Figure 5B:
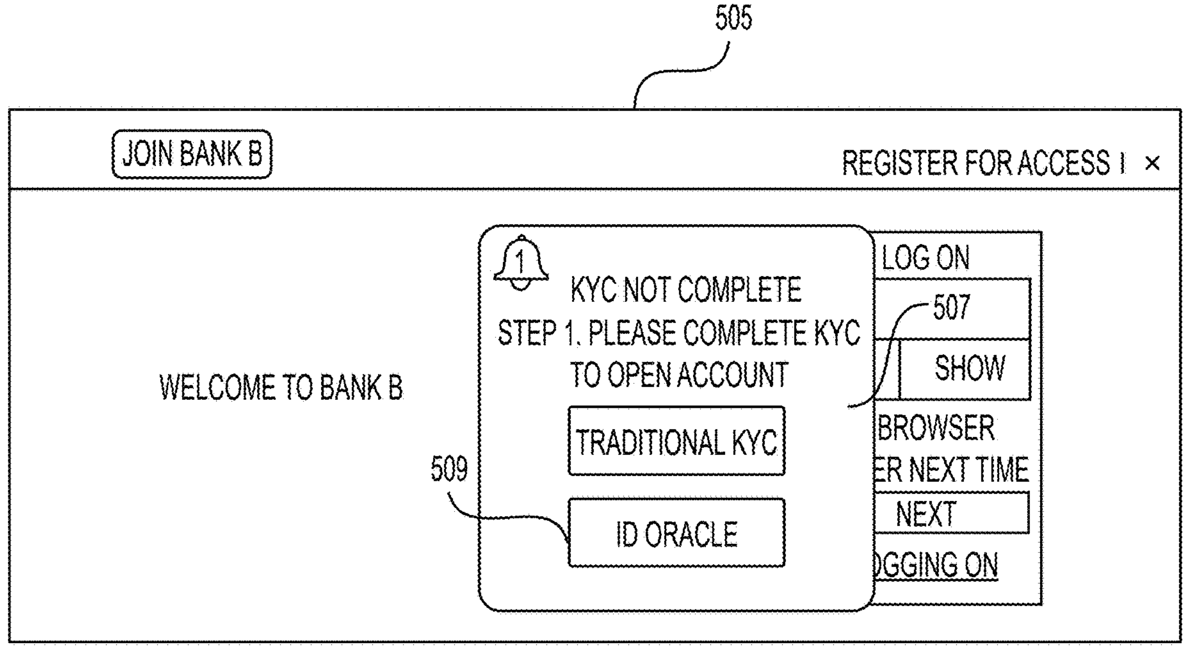

In one embodiment, bank B may use the previously generated blockchain-based NFT to authenticate user 101. Bank B may navigate user 101 to display 505 of FIG. 5B. In FIG. 5B, screen 505 may include a user interface element 507, e.g., a KYC registration tab. User 101 may select ID Oracle tab 509 from user interface element 507 to initiate an NFT-based authentication process. User 101 is then directed to screen 511 of FIG. 5C. Screen 511 may include user interface element 513 for using an existing token or to initiate a minting of tokens. In this instance, user 101 may choose to use the existing token by selecting user interface element 515.

Figures 5C, 5D:
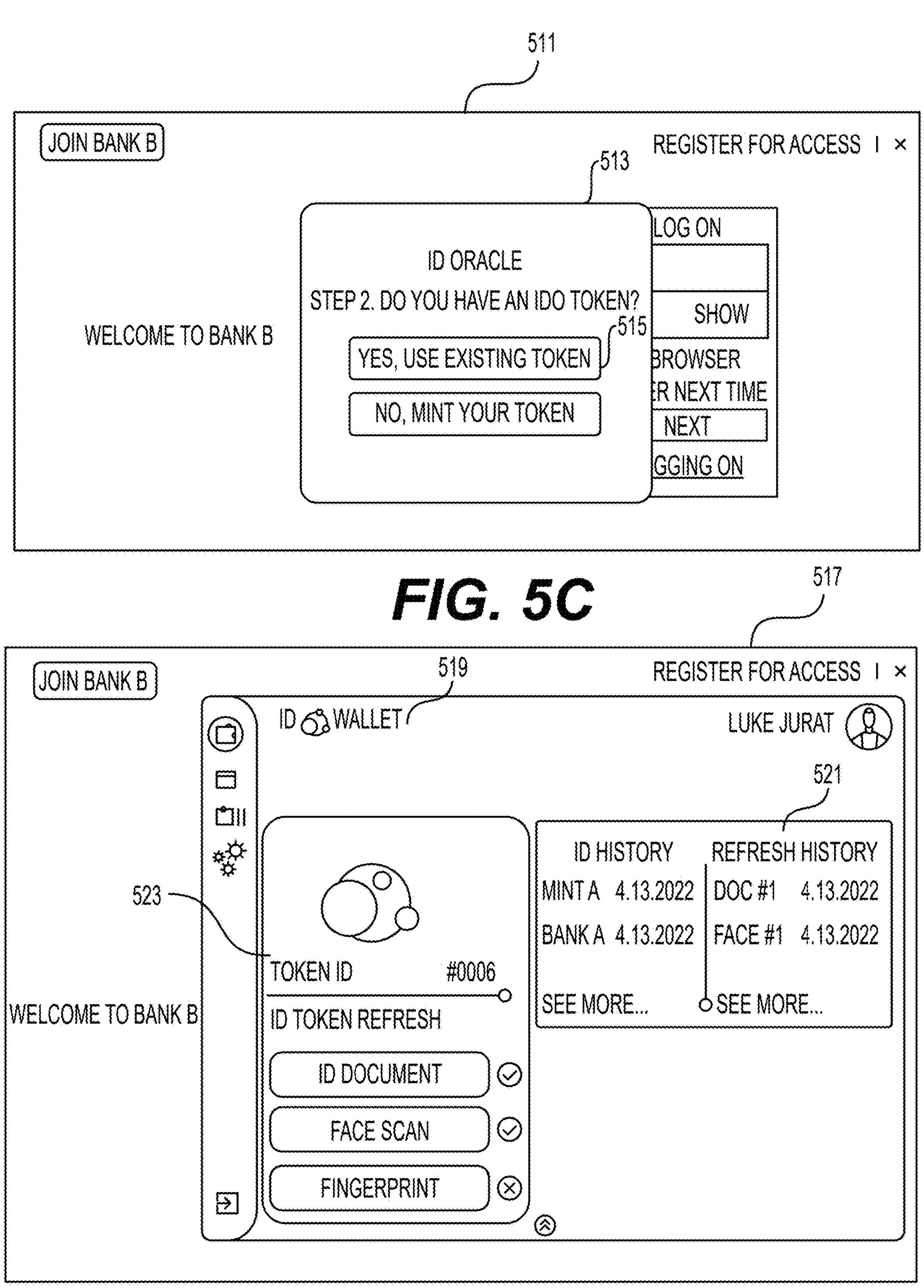

User 101 may be directed to display 517 of FIG. 5D. Display 517 may include a plurality of icons that may be invoked to perform different token-related functions. For example, user 101 may select wallet icon 519 to check token history, e.g., date and time NFTs were created, date and time NFTs were updated with additional personal data, entities or service providers that have access to the NFTs, etc. (as shown in user interface 521). User 101 may also select token ID tab 523 update token, e.g., replace expired identification documents with newly issued identification documents, upload a new biometric facial scan or fingerprint, etc. Dynamic NFTs are utilized to keep relevant data updated and also provides user 101 with complete control over their personal data. Once user 101 verifies that token-related information is accurate and up-to-date, user 101 may proceed with authorizing Bank B with access to the blockchain wallet.

Figure 5E:
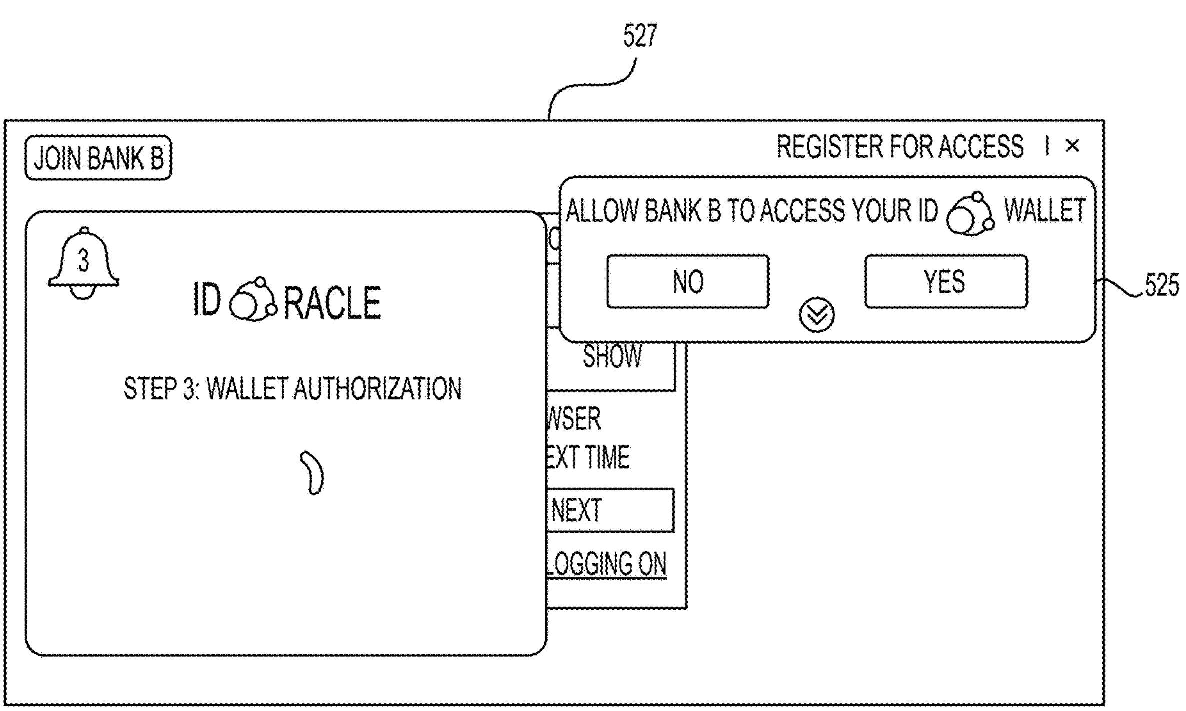
Figure 5F:
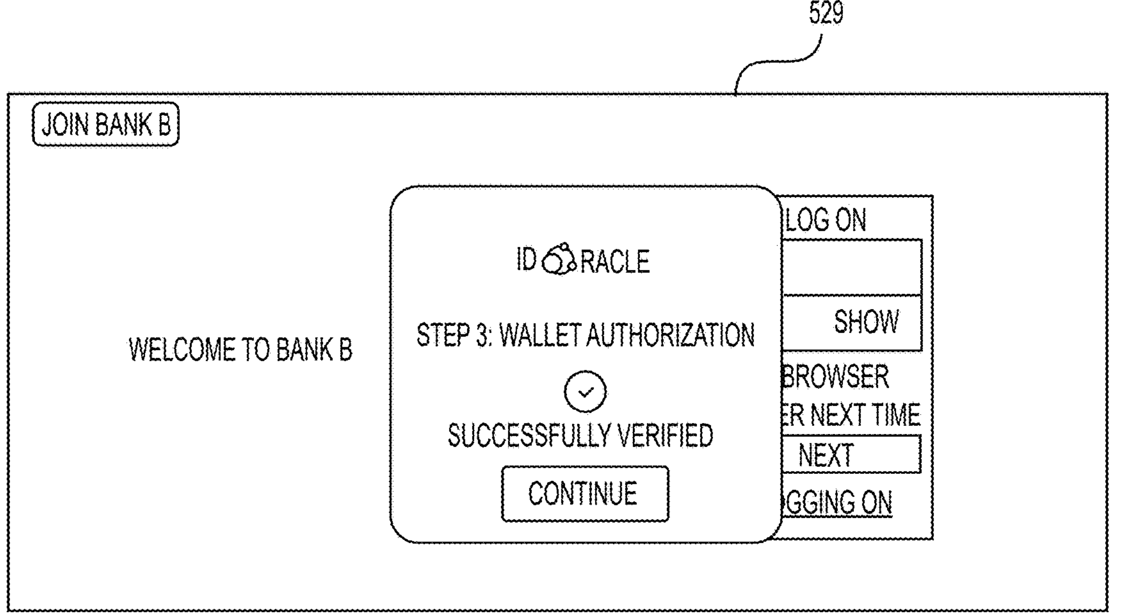

As illustrated, pop-up 525 in the right corner of user interface 527 of FIG. 5E may be a blockchain wallet in the form of a browser extension. In one instance, a request for wallet access may also be presented via application 105 in UE 103. In this embodiment, user 101 may grant access to the blockchain wallet, and Bank B may perform token verification. Basically, the user has control over how their tokens are used via their wallet. The identity of user 101 is verified once Bank A successfully verifies the NFTs. A successful wallet authorization and NFT verification may result in display 529 of FIG. 5F.

As illustrated, the blockchain-based dynamic NFTs may be utilized by a plurality of service providers, e.g., Bank A and Bank B, to authenticate the users. Such application of blockchain-based KYC solution to store user identification information as a dynamic NFT ensures smooth onboarding process for the users, e.g., reduces the KYC process to two clicks, thereby reducing the user abandonment rates. The risk of personal data leak is also reduced significantly by leveraging the blockchain technology.

Figure 6:
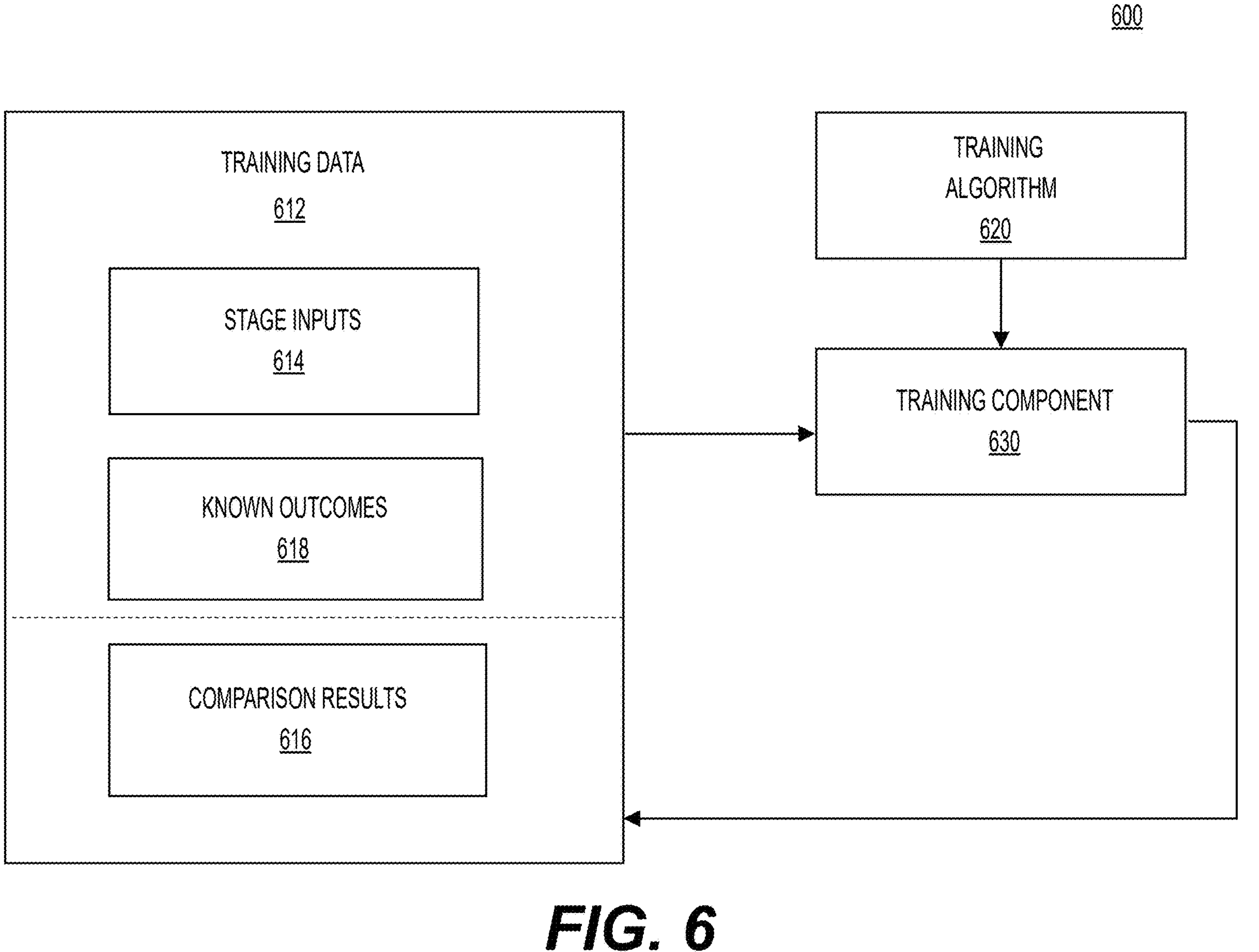
FIG. 6 shows an example machine learning training flow chart.

One or more implementations disclosed herein include and/or may be implemented using machine learning model, e.g., machine learning module 209. For example, one or more of the modules of authentication platform 113 may be implemented using a machine learning model and/or may be used to train the machine learning model. A given machine learning model may be trained using the data flow 600 of FIG. 6. Training data 612 may include one or more of stage inputs 614 and known outcomes 618 related to the machine learning model to be trained. The stage inputs 614 may be from any applicable source including text, visual representations, data, values, comparisons, stage outputs (e.g., one or more outputs from a step from FIG. 3). The known outcomes 618 may be included for the machine learning models generated based on supervised or semi-supervised training. An unsupervised machine learning model may not be trained using known outcomes 618. Known outcomes 618 may include known or desired outputs for future inputs similar to or in the same category as stage inputs 614 that do not have corresponding known outputs.

The training data 612 and a training algorithm 620 (e.g., one or more of the modules implemented using the machine learning model and/or may be used to train the machine learning model) may be provided to a training component 630 that may apply the training data 612 to the training algorithm 620 to generate the machine learning model. According to an implementation, the training component 630 may be provided comparison results 616 that compare a previous output of the corresponding machine learning model to apply the previous result to re-train the machine learning model. The comparison results 616 may be used by the training component 630 to update the corresponding machine learning model. The training algorithm 620 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

The machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIG. 3 may be performed by one or more processors of a computer system as described herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

FIG. 7 illustrates an implementation of a general computer system that may execute techniques presented herein. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a computer system 700 is illustrated as a single system, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may further include a display 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input/output device 712 configured to allow a user to interact with any of the components of computer system 700. The input/output device 712 may be a number pad, a keyboard, or a cursor control device, such as a mouse, or a joystick, touch screen display, remote control, or any other device operative to interact with the computer system 700.

The computer system 700 may also or alternatively include drive unit 706 implemented as a disk or optical drive. The drive unit 706 may include a computer-readable medium 722 in which one or more sets of instructions 724, e.g. software, can be embedded. Further, instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 730 can communicate voice, video, audio, images, or any other data over the network 730. Further, the instructions 724 may be transmitted or received over the network 730 via a communication port or interface 720, and/or using a bus 708. The communication port or interface 720 may be a part of the processor 702 or may be a separate component. The communication port or interface 720 may be created in software or may be a physical connection in hardware. The communication port or interface 720 may be configured to connect with a network 730, external media, the display 710, or any other components in computer system 700, or combinations thereof. The connection with the network 730 may be a physical connection, such as a wired Ethernet connection or may be established wirelessly as discussed below. Likewise, the additional connections with other components of the computer system 700 may be physical connections or may be established wirelessly. The network 730 may alternatively be directly connected to a bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to a network 730. The network 730 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 730 may include wide area networks (WAN), such as the Internet, local area networks (LAN), campus area networks, metropolitan area networks, a direct connection such as through a Universal Serial Bus (USB) port, or any other networks that may allow for data communication. The network 730 may be configured to couple one computing device to another computing device to enable communication of data between the devices. The network 730 may generally be enabled to employ any form of machine-readable media for communicating information from one device to another. The network 730 may include communication methods by which information may travel between computing devices. The network 730 may be divided into sub-networks. The sub-networks may allow access to all of the other components connected thereto or the sub-networks may restrict access between the components. The network 730 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for generating dynamic non-fungible tokens, comprising:

receiving an authentication request for a transaction from at least one device associated with a user;

collecting identification data associated with the at least one device or the user from one or more databases, the identification data including biometric data;

processing, via a machine learning model, the identification data associated with the at least one device or the user to generate the dynamic non-fungible tokens, wherein the processing the identification data to generate the dynamic non-fungible tokens includes cryptographically hashing the biometric data and concatenating each of the hashed biometric data in a predefined order;

storing, via the machine learning model, the dynamic non-fungible tokens in a transaction block of a distributed blockchain; and transmitting the dynamic non-fungible tokens to a digital wallet application to authenticate the transaction, wherein the dynamic non-fungible tokens are transmitted from a first digital wallet application associated with the user to a second digital wallet application with a service provider.

2. The method of claim 1, wherein a supervised learning is utilized to train the machine learning model, further comprises:

inputting, in real-time or near real-time, a set of training data into the machine learning model for generating the dynamic non-fungible tokens for storage into the distributed blockchain, wherein the training data includes an input and a correct output;

monitoring, in real-time or near real-time, accuracy of the machine learning model through a loss function; and adjusting the machine learning model until an identified error is minimized.

3. The method of claim 1, wherein generating the dynamic non-fungible tokens, further comprises:

generating and storing, via the machine learning model, a singular hash representing the concatenated hashed biometric data; and generating the dynamic non-fungible tokens representing the singular hash.

4. The method of claim 1, wherein storing the dynamic non-fungible tokens includes minting the dynamic non-fungible tokens, further comprises:

validating the dynamic non-fungible tokens;

creating a new transaction block in the distributed blockchain for the dynamic non-fungible tokens, and recording the dynamic non-fungible tokens into the transaction block in the distributed blockchain.

5. The method of claim 1, wherein collecting the identification data, further comprises:

generating, in a user interface of the at least one device, a notification requesting access to current location of the user; and comparing the current location of the user to a store location information to perform a location-based verification to authenticate the transaction.

6. The method of claim 5, further comprising:

generating, in the user interface of the at least one device, a presentation of one or more instructions to align an identification card, position a user's face in a specific position, or a combination thereof;

capturing, via one or more sensors, a plurality of images or videos of the identification card, the user's face, or a combination thereof; and analyzing, via one or more algorithms, the plurality of images or videos for accuracy.

7. The method of claim 1, further comprising:

receiving a blockchain address and a verification that the transaction block is recorded in the distributed blockchain; and monitoring, in real-time or near real-time, the distributed blockchain and at least one transaction on the distributed blockchain that matches the blockchain address.

8. The method of claim 7, further comprising:

updating metadata associated with the dynamic non-fungible token based, at least in part, on the monitoring;

generating a new dynamic non-fungible token based, at least in part, on the updated metadata; and concatenating the new dynamic non-fungible token to a preceding dynamic non-fungible token on the transaction block of the distributed blockchain.

9. The method of claim 1, wherein the distributed blockchain stores the dynamic non-fungible tokens as a sequence of transaction blocks, and wherein each of the transaction block is immutably connected to a preceding transaction block by a cryptographic hash function.

10. The method of claim 1, wherein the dynamic non-fungible tokens are non-fungible cryptographic assets in a standard token format, and wherein the dynamic non-fungible tokens are recorded in a programmatically defined smart contract written to the distributed blockchain.

11. A non-transitory computer readable medium for generating dynamic non-fungible tokens, the non-transitory computer readable medium storing instructions which, when executed by one or more processors, cause the one or more processors to perform operations, comprising:

receiving an authentication request for a transaction from at least one device associated with a user;

collecting identification data associated with the at least one device or the user from one or more databases, the identification data including biometric data;

processing, via a machine learning model, the identification data associated with the at least one device or the user to generate the dynamic non-fungible tokens, wherein the processing the identification data to generate the dynamic non-fungible tokens includes cryptographically hashing the biometric data and concatenating each of the hashed biometric data in a predefined order;

storing, via the machine learning model, the dynamic non-fungible tokens in a transaction block of a distributed blockchain; and transmitting the dynamic non-fungible tokens to a digital wallet application to authenticate the transaction, wherein the dynamic non-fungible tokens are transmitted from a first digital wallet application associated with the user to a second digital wallet application with a service provider.

12. The non-transitory computer readable medium of claim 11, wherein a supervised learning is utilized to train the machine learning model, further comprises:

inputting, in real-time or near real-time, a set of training data into the machine learning model for generating the dynamic non-fungible tokens for storage into the distributed blockchain, wherein the training data includes an input and a correct output;

monitoring, in real-time or near real-time, accuracy of the machine learning model through a loss function; and adjusting the machine learning model until an identified error is minimized.

13. The non-transitory computer readable medium of claim 11, wherein generating the dynamic non-fungible tokens, further comprises:

generating and storing, via the machine learning model, a singular hash representing the concatenated hashed biometric data; and generating the dynamic non-fungible tokens representing the singular hash.

14. The non-transitory computer readable medium of claim 11, wherein collecting the identification data, further comprises:

generating, in a user interface of the at least one device, a notification requesting access to current location of the user; and comparing the current location of the user to a store location information to perform a location-based verification to authenticate the transaction.

15. The non-transitory computer readable medium of claim 14, further comprising:

generating, in a user interface of the at least one device, a presentation of one or more instructions to align an identification card, position the user's face in a specific position, or a combination thereof;

capturing, via one or more sensors, a plurality of images or videos of the identification card, the user's face, or a combination thereof; and analyzing, via one or more algorithms, the plurality of images or videos for accuracy.

16. The non-transitory computer readable medium of claim 11, further comprising:

receiving a blockchain address and a verification that the transaction block is recorded in the distributed blockchain; and monitoring, in real-time or near real-time, the distributed blockchain and at least one transaction on the distributed blockchain that matches the blockchain address.

17. The non-transitory computer readable medium of claim 16, further comprising:

updating metadata associated with the dynamic non-fungible token based, at least in part, on the monitoring;

generating a new dynamic non-fungible token based, at least in part, on the updated metadata; and concatenating the new dynamic non-fungible token to a preceding dynamic non-fungible token on the transaction block of the distributed blockchain.

18. A system for generating dynamic non-fungible tokens, comprising:

one or more processors; and at least one non-transitory computer readable medium storing instructions which, when executed by the one or more processors, cause the one or more processors to perform operations comprising:

receiving an authentication request for a transaction from at least one device associated with a user;

collecting identification data associated with the at least one device or the user from one or more databases, the identification data including biometric data;

processing, via a machine learning model, the identification data associated with the at least one device or the user to generate the dynamic non-fungible tokens, wherein the processing the identification data to generate the dynamic non-fungible tokens includes cryptographically hashing the biometric data and concatenating each of the hashed biometric data in a predefined order;

storing, via the machine learning model, the dynamic non-fungible tokens in a transaction block of a distributed blockchain; and transmitting the dynamic non-fungible tokens to a digital wallet application to authenticate the transaction, wherein the dynamic non-fungible tokens are transmitted from a first digital wallet application associated with the user to a second digital wallet application with a service provider.

19. The system of claim 18, wherein a supervised learning is utilized to train the machine learning model, further comprises:

inputting, in real-time or near real-time, a set of training data into the machine learning model for generating the dynamic non-fungible tokens for storage into the distributed blockchain, wherein the training data includes an input and a correct output;

monitoring, in real-time or near real-time, accuracy of the machine learning model through a loss function; and adjusting the machine learning model until an identified error is minimized.

20. The system of claim 18, wherein generating the dynamic non-fungible tokens, further comprises:

generating and storing, via the machine learning model, a singular hash representing the concatenated hashed biometric data; and generating the dynamic non-fungible tokens representing the singular hash.

* * * * *